United States Patent
Morotomi et al.

(10) Patent No.: US 7,099,557 B1
(45) Date of Patent: Aug. 29, 2006

(54) RECORDING AND/OR REPRODUCING APPARATUS AND EDITING METHOD

(75) Inventors: Shiro Morotomi, Kanagawa (JP); Tomoyo Kashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1174 days.

(21) Appl. No.: 09/830,309

(22) PCT Filed: Aug. 25, 2000

(86) PCT No.: PCT/JP00/05741

§ 371 (c)(1),
(2), (4) Date: Apr. 25, 2001

(87) PCT Pub. No.: WO01/16953

PCT Pub. Date: Mar. 8, 2001

(30) Foreign Application Priority Data

Aug. 27, 1999 (JP) ................. 11-241540

(51) Int. Cl.
H04N 5/93 (2006.01)

(52) U.S. Cl. .................... 386/52; 386/95; 386/125

(58) Field of Classification Search ............... 386/4, 386/45, 52, 55, 83, 95, 105, 125, 126; 360/27, 360/72.1, 13; 369/83, 47.13
See application file for complete search history.

(56) References Cited

U.S. PATENT DOCUMENTS

| | | | |
|---|---|---|---|
| 5,488,409 A * | 1/1996 | Yuen et al. | 386/83 |
| 5,532,830 A * | 7/1996 | Schuler | 386/125 |
| 5,889,916 A | 3/1999 | Kimura et al. | |
| 6,052,508 A * | 4/2000 | Mincy et al. | 386/52 |
| 6,181,870 B1 * | 1/2001 | Okada et al. | 386/95 |
| 6,577,812 B1 * | 6/2003 | Kikuchi et al. | 386/105 |
| 2002/0097255 A1 | 7/2002 | Toyoda et al. | |
| 2003/0206714 A1 | 11/2003 | Ando et al. | |

FOREIGN PATENT DOCUMENTS

| | | |
|---|---|---|
| JP | 61-139905 | 6/1986 |
| JP | 4-313876 | 11/1992 |
| JP | 5-225759 | 9/1993 |
| JP | 6-153046 | 5/1994 |
| JP | 7-312737 | 11/1995 |
| JP | 7-320454 | 12/1995 |
| JP | 8-36801 | 2/1996 |
| JP | 9-180409 | 7/1997 |
| JP | 10-162369 | 6/1998 |
| JP | 11 195288 | 7/1999 |
| JP | 11 273 230 | 10/1999 |
| WO | WO 84 02606 | 7/1984 |
| WO | WO 96 26600 | 8/1996 |

\* cited by examiner

*Primary Examiner*—James J. Groody
*Assistant Examiner*—Christopher Onuaku
(74) *Attorney, Agent, or Firm*—Frommer Lawrence & Haug LLP; William S. Frommer; Thomas F. Presson

(57) ABSTRACT

A portable recording and/or reproducing apparatus for recording and/or reproducing data to and/or from a storage medium are provided. The medium has a data area and a management area. The data area stores data and the management area stores management information for managing the data. The apparatus includes stopping means for stopping reproduction of the data according to a user's input. Updating means for updates the management information so that an address of the storage medium corresponding to the stop position of the reproduced data determined by the user's input becomes the end address of the reproduced data.

6 Claims, 14 Drawing Sheets

Fig. 3

| | MD-DATA2 | MD-DATA1 |
|---|---|---|
| TRACK PITCH | 0.95 μm | 1.6 μm |
| PIT LENGTH | 0.39 μm/bit | 0.59 μm/bit |
| λ·NA | 650nm·0.52 | 780nm·0.45 |
| RECORDING SYSTEM | LAND RECORDING | GROOVE RECORDING |
| ADDRESSING SYSTEM | INTERLACE ADDRESSING (SINGLE SIDE WOBBLES OF DOUBLE SPIRAL) | BOTH SIDE WOBBLES OF SINGLE SPIRAL |
| MODULATING SYSTEM | RLL(1,7) | EFM |
| ERROR CORRECTING SUSTEM | RS-PC | ACIRC |
| INTERLEAVE | BLOCK COMPLETION | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORD CAPACITY | 650MB | 140MB |

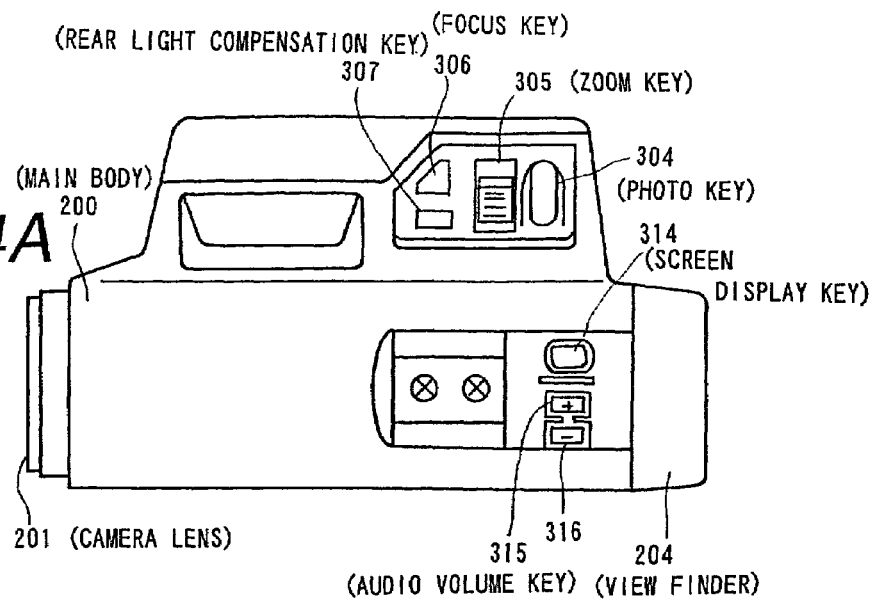
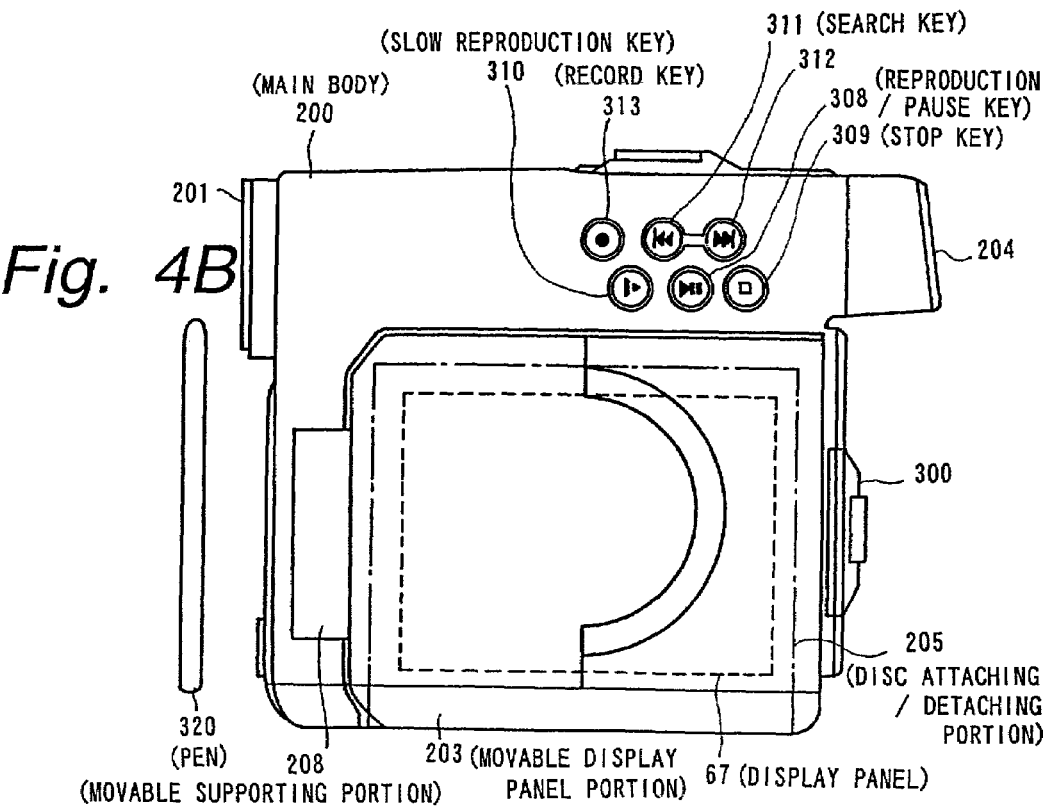

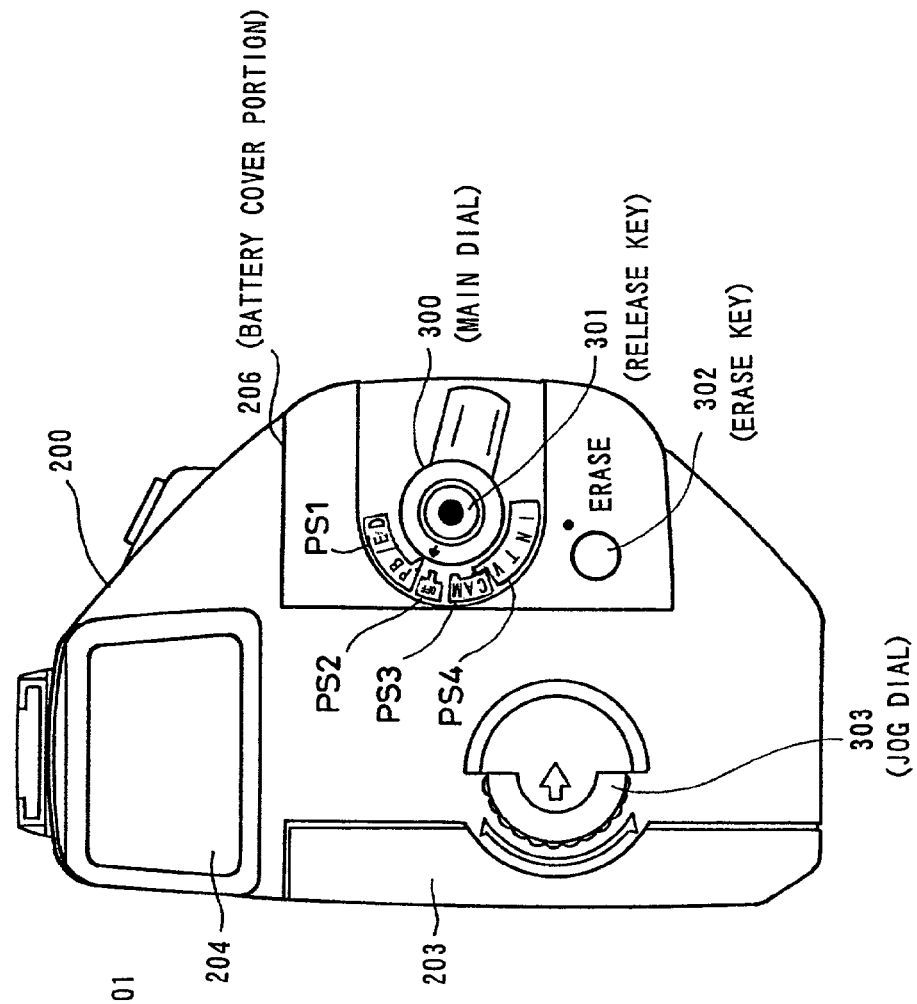
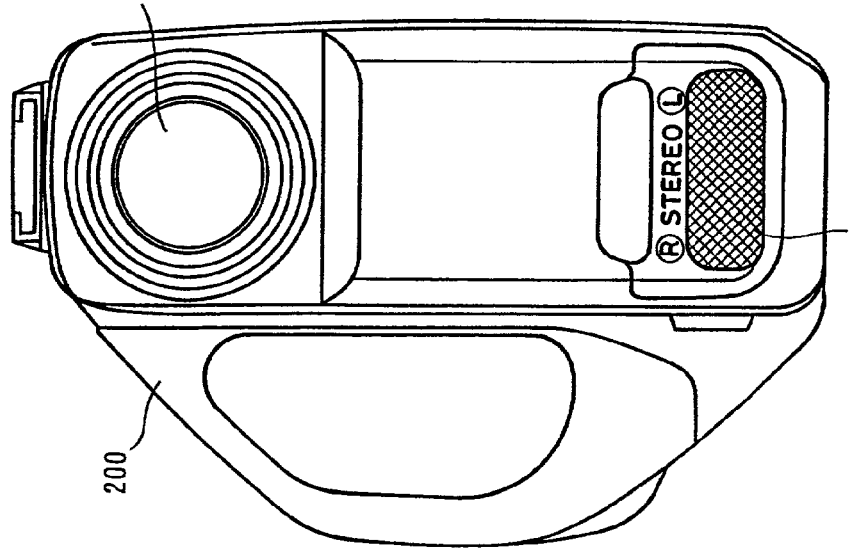

DATA STRUCTURE OF DISC

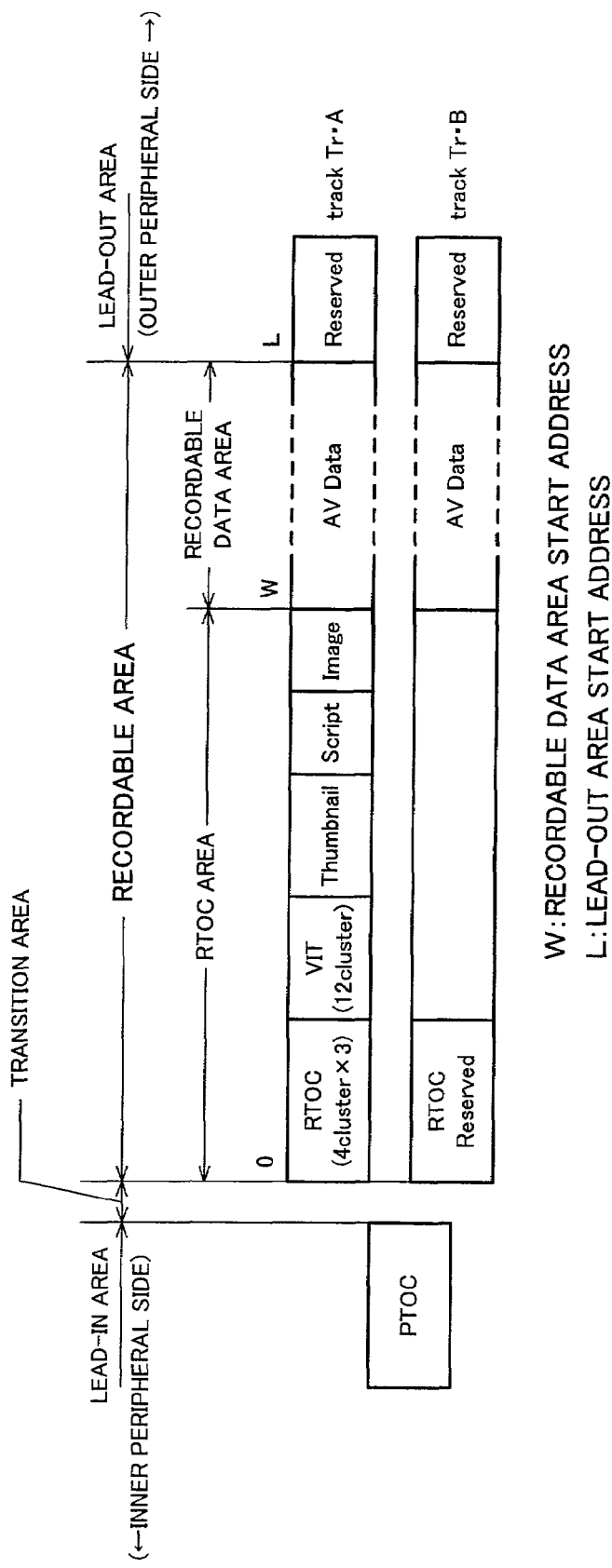

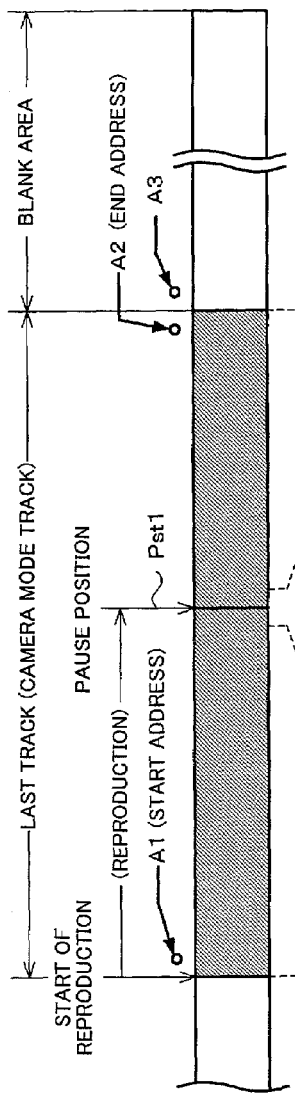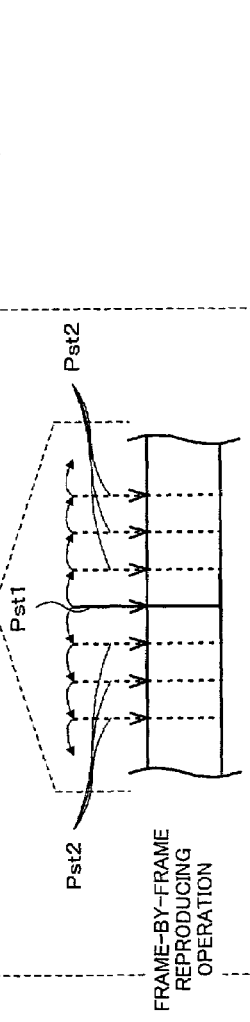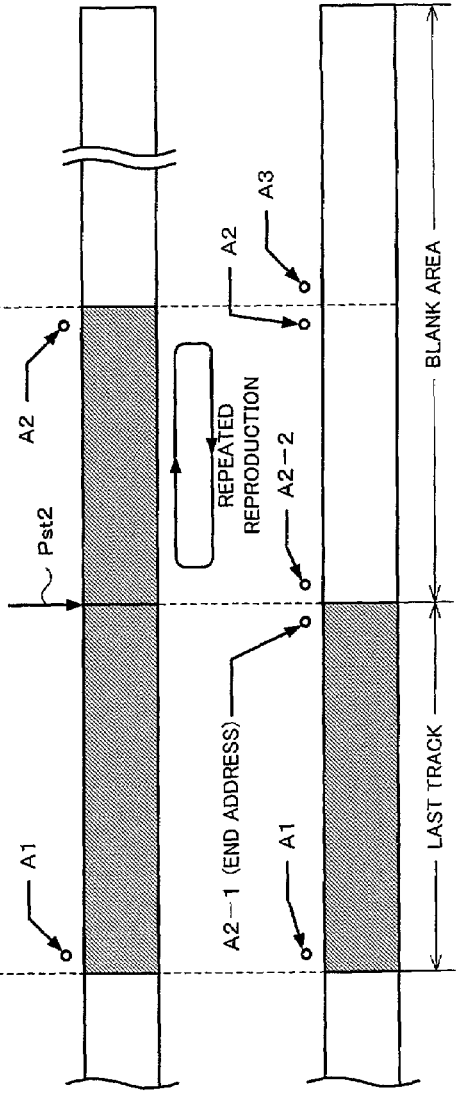
Fig. 11A
Fig. 11B
Fig. 11C
Fig. 11D

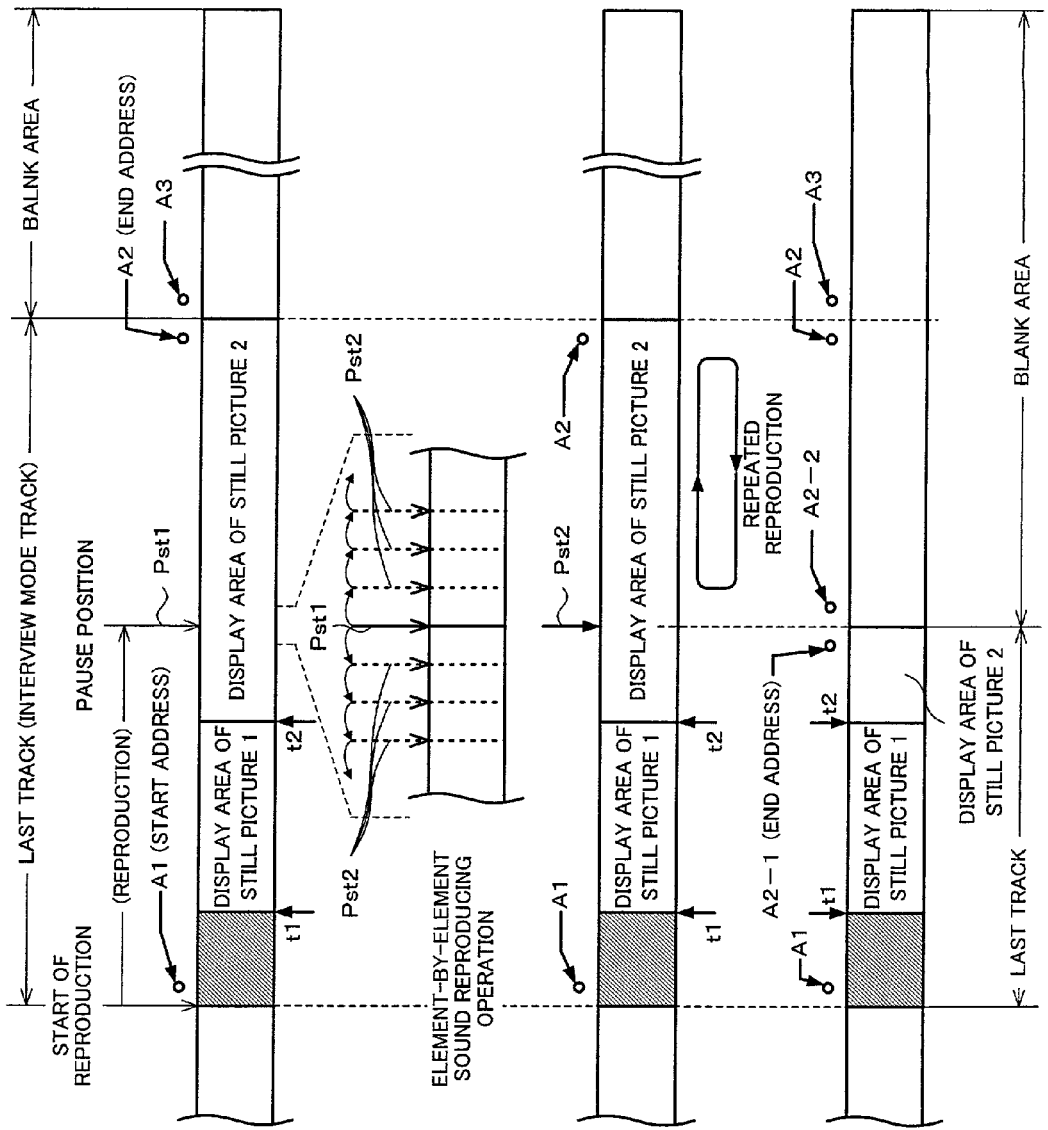

| Fig. 13A |
| Fig. 13B |

RECORDING AND/OR REPRODUCING APPARATUS AND EDITING METHOD

TECHNICAL FIELD

The present invention relates to a recording and/or reproducing apparatus that can record and/or reproduce data to/from a record medium. In addition, the present invention relates to an editing method of the recording and/or reproducing apparatus.

RELATED ART

Presently, portable video cameras integrally composed of an photographing device such as a camera and a video deck that can record and reproduce a picture and a sound have become common. As a standard operation mode of such a portable video camera, while the user is photographing his or her favorite object, he or she record it to the portable video camera. The user can reproduce the recorded the recorded picture/sound and display the reproduced picture/sound on a displaying portion of the video deck or an external monitor device.

SUBJECT THAT THE INVENTION IS TO SOLVE

It seems that the user of the video camera wants to produce a valuable video work by editing a photographed picture, rather than simply record it.

As one editing operation, an inter-scene editing operation for connecting scenes is known.

It is supposed that the user wants to change the end position of a scene so that photographed scenes are properly connected scenes. In this case, when the user operates a video camera using a tape as a record medium, while reproducing and seeing a scene, he or she stops the reproducing operation at his or her desired position. Thereafter, the user photographs a new scene after the reproduction stop position of the tape. At that point, an overwrite recording operation of which the recorded data is erased and substituted with newly recorded data should be performed.

When the user photographs a picture, if he or she wants to change the start position of a scene, data that has been recorded before the changed start position should be erased. However, when the video camera uses a tape as a record medium, even if data that has been recorded before the changed start position is erased, as the tape is traveled, data (erased data) of the portion is reproduced. In other words, a reproducing operation of which an erased portion is skipped and the portions before and after the erased portion are connected cannot be performed. To do such an editing operation, picture data should be captured by a personal computer or the like. Thus, the editing operation cannot be easily performed.

In a well-known recording and reproducing apparatus using an magneto-optical disc such as an MD (Mini Disc-trade mark), audio data recorded on the MD is edited for each program (track). Examples of editing functions that can be performed for each track are a track dividing function, a track combining function, and a track erasing operation.

When the user wants to change an end position or a start position of a particular track corresponding to a change of an end position or a start position of a scene with the MD recording and reproducing apparatus, he or she reproduces the track, hears the sound thereof, and pauses the reproduction of the sound at his desired end position or start position. First, the user should perform a track dividing operation at the pause position and then an erasing operation for one of the divided tracks. In other words, to change an end position or a start position of recorded data, two track editing operations that are a track dividing operation and a track erasing operation should be performed.

DISCLOSURE OF THE INVENTION

In consideration of the above-described problem, an object of the present invention is to allow an end position or a start position of recorded data to be more easily performed so as to more easily perform an editing operation for recorded data or the like than before.

Claim 1 of the present invention is a recording and/or reproducing apparatus for recording and/or reproducing data to and/or from a storage medium having a data area and a management area, the data area storing data, the management area storing management information for managing the data, the apparatus comprising a reproducing means for reproducing the data corresponding to management information that is read from the storage medium, a stopping means for stopping reproducing the data, and an updating means for updating the management information so that an address of the storage medium corresponding to the stop position of the reproduced data becomes the end address of the reproduced data.

Claim 19 of the present invention is a recording and/or reproducing apparatus for recording and/or reproducing data to and/or from a storage medium having a data area and a management area, the data area storing data, the management area storing management information for managing the data, the apparatus comprising a reproducing means for reproducing the data corresponding to management information that is read from the storage medium, a designating means for designating a particular time point of the reproduced data, and an updating means for updating the management information so that an address of the storage medium corresponding to the designated time point of the reproduce data becomes the start address of the reproduced data.

Claim 39 of the present invention is an editing method for editing data stored to a storage medium having a data area and a management area, the data area storing data, the management area storing management information for managing the data, the method comprising the steps of reproducing the data corresponding to management information that is read from the storage medium, stopping reproducing the data, and updating the management information so that an address of the storage medium corresponding to the stop position of the reproduced data becomes the end address of the reproduced data.

Claim 40 of the present invention is an editing method for editing data stored to a storage medium having a data area and a management area, the data area storing data, the management area storing management information for managing the data, the method comprising the steps of reproducing the data corresponding to management information that is read from the storage medium, designating a particular time point of the reproduced data, and updating the management information so that an address of the storage medium corresponding to the designated time point of the reproduce data becomes the start address of the reproduced data.

Claim 41 of the present invention is an editing method for editing data stored to a storage medium having a data area and a management area, the data area storing data, the management area storing management information for managing the data, the method comprising the steps of reproducing the data corresponding to the management information that is read from the storage medium, designating two predetermined time points of the reproduced data, and updating the management information so that an address of the storage medium corresponding to one of the two time points becomes the start address of the reproduced data and an address of the storage medium corresponding to the other time point becomes the end of the reproduced data.

According to claims 1 and 39 of the present invention, corresponding to management information that is read from a storage medium, data is reproduced and the reproduction thereof is stopped. The management information is updated so that an address of the storage medium corresponding to the reproduction stop position of data becomes an end address of the reproduced data. Thus, the end address can be updated in a simple operation.

According to claims 19 and 40 of the present invention, corresponding to management information that is read from a storage medium, data is reproduced and the reproduction thereof is stopped. A particular time point of the reproduced data is designated. The management information is updated so that an address of the storage medium corresponding to the designated time point of the reproduced data becomes a start address of the reproduced data. Thus, the start address can be updated in a simple operation.

According to claim 41 of the present invention, corresponding to management information that is read from a storage medium, two particular time points of reproduced data are designated. The management information is updated so that an address of the storage medium corresponding to one of the two designated time points becomes a start address of the reproduced data and an address of the storage medium corresponding to the other time point becomes an end address of the reproduced data. Thus, the start address and the end address of the reproduced data can be designated in a simple operation. As a result, a trimming editing operation can be easily performed.

BRIEF DESCRIPTION OF DRAWINGS

FIG. 3 is a schematic diagram for explaining specifications of the disc for the video camera according to the embodiment;

FIG. 4A is a side view showing the video camera according to the embodiment; FIG. 4B is a plan view showing the video camera according to the embodiment;

FIG. 5A is a front view showing the video camera according to the embodiment; FIG. 5B is a rear view showing the video camera according to the embodiment;

FIG. 10 is a schematic diagram showing the concept of an example of the relation between the data structure of the disc according to the embodiment and physical regions of the disc;

FIG. 11A is a schematic diagram for explaining a first step of a data end position change editing operation (camera mode) according to the embodiment; FIG. 11B is a schematic diagram for explaining a second step of the data end position change editing operation (camera mode) according to the embodiment; FIG. 11C is a schematic diagram for explaining a third step of the data end position change editing operation (camera mode) according to the embodiment; FIG. 11D is a schematic diagram for explaining a fourth step of the data end position change editing operation (camera mode) according to the embodiment;

FIG. 12A is a schematic diagram for explaining a first step of a data end position change editing operation (interview mode) according to the embodiment; FIG. 12B is a schematic diagram for explaining a second step of the data end position change editing operation (interview mode) according to the embodiment; FIG. 12C is a schematic diagram for explaining a third step of the data end position change editing operation (interview mode) according to the embodiment; FIG. 12D is a schematic diagram for explaining a fourth step of the data end position change editing operation (interview mode) according to the embodiment;

BEST MODES FOR CARRYING OUT THE INVENTION

Figure 1:
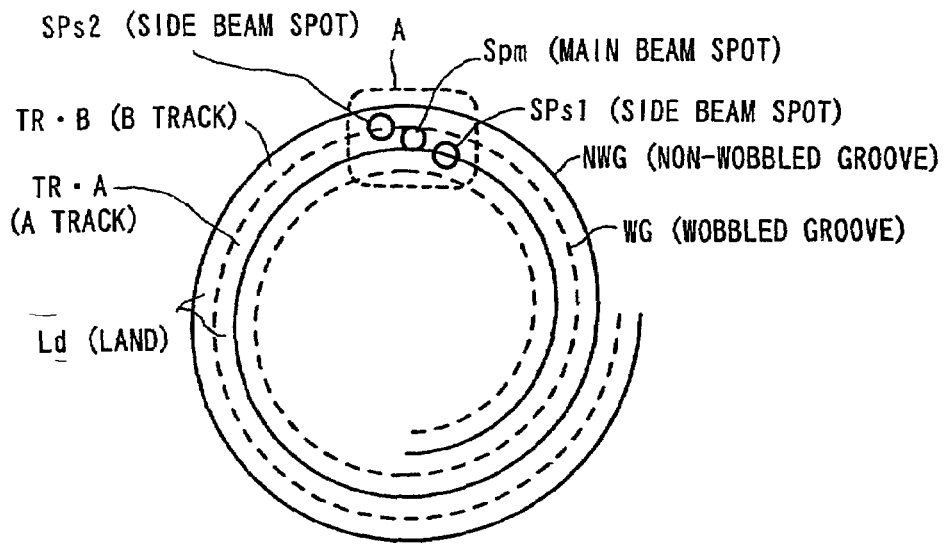
FIG. 1 is a schematic diagram for explaining the track structure of a disc for a video camera according to an embodiment of the present invention.

Next, an embodiment of the present invention will be described

As an embodiment of the present invention, a portable video camera that is integrally composed of a camera device and a recording and reproducing portion that can record and reproduce a picture (a still picture or a moving picture), a sound, and so forth will be described. The recording and reproducing portion of the video camera according to the embodiment is structured so that data is recorded and reproduced corresponding to so-called Mini Disc known as a kind of a magneto-optical disc.

The embodiment of the present invention will be described in the following order.

1. Disc format
2. Appearance of video camera
3. Internal structure of video camera
4. Structure of media driving portion
5. Example of disc structure according to embodiment
6. Data end position change editing operation
6-1. Outline of operation 1 (in the case of camera mode)
6-2. Outline of operation 2 (in the case of interview mode)
6-3. Process
7. Trimming editing operation 1. Disc Format The recording and reproducing portion of the video camera according to the embodiment corresponds to a format of so-called MD data of which data is recorded to and/or recorded from the Mini Disc (magneto-optical disc). Two MD data formats that are MD-DATA 1 and MD-DATA 2 have been developed so far. The video camera according to the embodiment records and reproduces data corresponding to the MD-DATA 2 format that is a higher record density format than the MD-DATA 1 format. First of all, the disc format of the MD-DATA 2 format will be described.

Figures 2A, 2B:
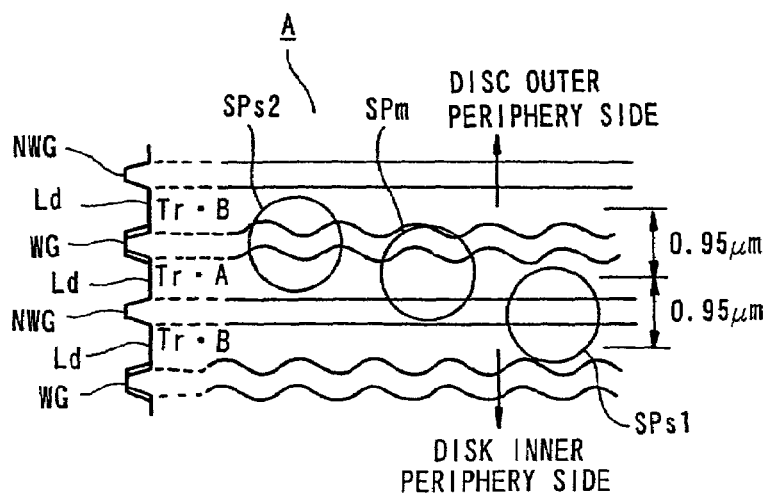
FIG. 2A is an enlarged sectional view showing a track portion of the disc for the video camera according to the embodiment.
FIG. 2B is an enlarged plan view showing the track portion of the disc for the video camera according to the embodiment.

FIGS. 1 and 2 conceptually show an example of the track structure of a disc corresponding to the MD-DATA 2 format. FIGS. 2A and 2B are an enlarged sectional view and an enlarged plan view showing a portion surrounded by a dotted box A of FIG. 1, respectively.

As shown in those drawings, two types of grooves are pre-formed on the disc surface. The first type groove is a wobbled groove WG of which a groove is wobbled. The second type groove is a non-wobbled groove NWG of which a groove is not wobbled. The wobbled groove WG and the non-wobbled groove NWG are formed in a double spiral shape on the disc so that a land Ld is formed therebetween.

In the MD-DATA 2 format, the land Ld is used as a record track (on which data is recorded). Since the wobbled groove WG and the non-wobbled groove NWG are pre-formed in such a manner, two tracks Tr•A and Tr•B as record tracks are independently formed in a double spiral shape.

On the track Tr•A, the wobbled groove WG and the non-wobbled groove NWG are formed on the disc outer peripheral side and the disc inner peripheral side, respectively.

In contract, on the track Tr•B, the wobbled groove WG and the non-wobbled groove NWG are formed on the disc inner peripheral side and the disc outer peripheral side, respectively.

In other words, on the track Tr•A, a wobble is formed on only the disc outer peripheral side. In contrast, on the track Tr•B, a wobble is formed on only the disc inner peripheral side.

In this case, the track pitch is the distance between the center positions of the adjacent track Tr•A and track Tr•B. As shown in FIG. 2B, the track pitch is 0.95 ìm.

A wobble is formed on a groove as a wobbled groove WG corresponding to a signal of which a physical address on the disc is encoded by FM modulation and bi-phase modulation. Thus, by demodulating information reproduced from a wobbled groove, a physical address on the disc can be extracted.

Address information as a wobbled groove WG is in common with the track Tr•A and the track Tr•B. In other words, the track Tr•A and the track Tr•B formed on the inner peripheral side and the outer peripheral side of the wobbled groove WG share address information assigned to a wobble of the wobbled groove WG.

Such an addressing system is also referred to as interlace addressing system. Using the interlace addressing system, while cross talk between adjacent wobbles is suppressed, the track pitch can be decreased. The addressing system of which wobbles are formed on a groove as addresses is also referred to as ADIP (Adress in Pregroove) system.

Identification that represents which of the track Tr•A and the track Tr•B that share the same address information is currently traced is performed in the following manner.

For example, using a three-beam system, while a main beam is tracing a track (land Ld), the other two side beams trace grooves on both the sides of the track.

As a real example, FIG. 2B shows the state that a main beam spot SPm is tracing the track Tr•A. In this case, a side beam spot SPs1 on the inner peripheral side traces the non-wobbled groove NWG, whereas a side beam spot SPs2 on the outer peripheral side traces the wobbled groove WG.

On the other hand, in the case that the main beam spot SPm is tracing the track Tr•B, the side beam spot SPs1 traces the wobbled groove WG, whereas the side beam spot SPs2 traces the non-wobbled groove NWG (this case is not shown).

Thus, depending on whether the main beam spot SPm traces the track Tr•A or the track Tr•B, the grooves that the side beam spots SPs1 and SPs2 trace vary between the wobbled groove WG and the non-wobbled groove NWG.

The waveform of a detected signal obtained by a photo detector due to the reflections of the side beam spots SPs1 and SPs2 varies depending on which of wobbled groove WG and the non-wobbled groove NWG the side beam spots SPs1 and SPs2 are tracing. Thus, depending on which of the side beam spots SPs1 and SPs2 is tracing the wobbled groove WG (or the non-wobbled groove NWG), it can be determined which of the track (track Tr•A or the track Tr•B) the main beam is tracing.

FIG. 3 is a schematic diagram showing the comparison of major specifications of the above-described MD-DATA 2 format and MD-DATA 1 format.

In the MD-DATA 1 format, the track pitch is 1.6 µm; the pit length is 0.59 µm/bit, the laser wavelength is $\lambda=780$ nm; and the aperture of an optical head is NA=0.45.

The recording system of the MD-DATA 1 format is groove recording system. In other words, in the MD-DATA 1 format, a groove is used as a track for recording and reproducing data.

As the addressing system in the MD-DATA 1 format, a groove (track) is formed in a single spiral shape. Wobbles are formed as address information on both sides of the groove. In other words, as the addressing system of the MD-DATA 1 format, a wobbled groove is used.

In the MD-DATA 1 format, as the record data modulating system, the EFM (eight-fourteen conversion) system is used. As the error correction system, the ACIRC (Advanced Cross Interleave Reed-Solomon Code) is used. As the data interleave system, the convolution type is used. Thus, in the MD-DATA 1 format, the data redundancy is 46.3%.

In the MD-DATA 1 format, as the disc driving system, the CLV (Constant Linear Velocity) is used. The linear velocity of the CLV is 1.2 m/sec. The standard data rate in the record/reproduction mode is 133 kB/sec. The record capacity is 140 MB.

On the other hand, in the MD-DATA 2 format for the video camera according to the embodiment, the track pitch is 0.95 µm and the pit length is 0.39 µm/bit that are smaller than those in the MD-DATA 1 format. In addition, to accomplish the above-mentioned pit length, the laser wave length is $\lambda=650$ nm and the aperture rate of the optical head is NA=0.52 so that the beam spot diameter in the in-focus position is narrowed and the band of the optical system is widened.

As was described with reference to FIGS. 1, 2A, and 2B, as the recording system, the land recording system is used. As the addressing system, the interlace addressing system is used. As the record data modulating system, RLL (1. 7) (RLL: Run Length Limited) system that is suitable for high density recording is used. As the error correction system, the RS-PC system is used. As the de-interleaving system, the block completion type is used. As a result, in the MD-DATA 2 format, the data redundancy is suppressed as low as 19.7%.

In the MD-DATA 2 format, as the disc driving system, the CLV is used. The linear velocity is 2.0 m/sec. The standard data rate in the record and reproduction modes is 589 kB/sec. The record capacity is 650 MB. In the MD-DATA 2 format, high density recording can be accomplished around four times higher than that in the MD-DATA 1 format.

When a moving picture is recorded in the MD-DATA 2 format, if the moving picture data is compression-encoded in the MPEG2 format, although the record time depends on the bit rate of the encoded data, a moving picture for 15 to 17 minutes can be recorded. When only audio signal data is recorded, if it is compression-encoded in the ATRAC (Adaptive Transform Acoustic Coding) 2 (trade mark) format, audio data for around 10 hours can be recorded.

2. Appearance of Video Camera

Next, an example of the appearance of the video camera will be described.

FIGS. 4A, 4B, 5A, and 5B are a plan view, a side view, a front view, and a rear view of the video camera according to the embodiment.

As shown in those drawings, a camera lens 201 is disposed at a front portion of a main body 200 of the video camera according to the embodiment. The camera lens 201 comprises a photographing lens and a diaphragm for photographing a picture. A microphone 202 is disposed at a front lower portion of the main body 200. The microphone 202 is used to collect an external sound when a picture is photographed. In other words, the video camera can record a picture photographed by the camera lens 201 and a stereo sound collected by the microphone 202. In addition, a speaker 205 is disposed at the same position as the microphone 202. The speaker 205 outputs a reproduced sound. In addition, the speaker 205 outputs a particular message sound such as a beep sound.

A view finder 204 is disposed in the rear of the main body 200. While the video camera is in the record mode, the standby mode, and so forth, the view finder 204 displays a picture captured from the camera lens 201 (this picture is referred to as through picture), characters, and so forth. The user can photograph a picture while seeing the view finder 204.

A portion that has a main dial 300, a release key 301, and an erase key 302 functions as a battery cover portion 206 that can be opened and closed. When the battery cover portion 206 is opened, a battery (rechargeable battery) can be mounted or dismounted.

A movable panel portion 203 is disposed on one side of the main body 200. The movable panel portion 203 is supported by a movable supporting portion 208. With the movable supporting portion 208, the movable panel portion 203 is movably mounted to the main body 200. The expansion of the movable panel portion 203 will be described later.

A display panel 67 (display screen) is disposed in the rear of the movable panel portion 203. Thus, when the movable panel portion 203 is in the non-expanded state shown in FIG. 4B, the display panel 67 is housed in the main body 200 in such a manner that the display panel 67 faces the main body 200.

The display panel 67 is a portion that displays and outputs a photographed picture. In addition, the display panel 67 displays and outputs a picture and so forth that are reproduced by the internal recording and reproducing device. Moreover, the display panel 67 displays messages using text and characters corresponding to the operations of the video camera. According to the embodiment, the display device used as the display panel 67 is not limited. The display device is for example a liquid crystal display or the like.

In addition, the display panel 67 has a touch panel that senses a pressing operation on the display surface of the liquid crystal display and outputs the sensed result as operation information to the rear surface thereof. In other words, according to the embodiment, an operation as a so-called GUI for pressing a picture displayed on the display panel 67 can be performed.

As an operation for the display panel 67, since the position at which a pressure is applied on the touch panel is detected as coordinate position information, a finger of the user or the like can be used. However, when the display area of the display panel 67 is limited, it may be difficult to operate it with a finger of the user. To solve such a problem, the video camera is accompanied by a stick type pen 320 as shown in FIG. 4B. Thus, the user can perform the pointing (touching) operation for the display panel 67 using the pen 320 instead of a finger of the user.

A portion that houses the movable panel portion 203 on the main body 200 side is a disc attaching/detaching portion 205. With the disc attaching/detaching portion 205, a disc as a record medium for the video camera according to the embodiment is attached and detached.

In addition, a video output terminal, a headphone/line terminal, and so forth (not shown) are disposed. The video output terminal is used to output a reproduced picture signal and so forth to an external video device. The headphone/line terminal is used to output a reproduced audio signal to an external audio device and a headphone. Moreover, an I/F terminal and so forth are disposed. The I/F terminal is used to transmit data to an external data device corresponding to an interface function.

Each portion of the main body 200 has various switches used for the user to operate the main body 200. Next, major switches will be described.

As shown in FIG. 5B, a main dial 300 is disposed in the rear of the main body 200. The main dial 300 is used to turn on/off the video camera and set the recording operation and the reproducing operation. The main dial 300 is rotatably used.

When the main dial 300 is placed in a power off position PS2, the power of the video camera is in the off state. When the main dial 300 is rotated from the off position to a reproduction/edit position PS1, the power of the video camera is turned on. In the reproduction/edit position PS1, a recorded picture file can be reproduced. In addition, various editing operations can be performed. When the main dial 300 is rotated to a camera mode position PS3, a picture file as a moving picture or a still picture can be recorded (camera mode) in the power on state. When the main dial 300 is rotated to a camera mode position PS4, the video camera can be used in an interview mode.

In the interview mode (although detail description is omitted), as a recording operation, mainly a sound is recorded. At any desired points, when the release key 301 or a photo key 304 is pressed, photographed pictures are recorded as still pictures. When the reproducing operation is performed in the interview mode, pictures recorded in the interview mode are reproduced. When the reproducing operation is performed in the interview mode, while a sound is reproduced, recorded still pictures are successively displayed at timings of which the still pictures have been recorded.

At the center of the rotating portion of the main dial 300, the release key 301 is disposed. The release key 301 functions as a record start/end switch in the camera mode or the interview mode.

A so-called jog dial 303 is disposed at a rear position of the main body 200. The jog dial 303 is an operating portion that can be rotated and pressed. The jog dial 303 is a disc shaped switch that can be rotated forward and backward. The jog dial 303 is clicked at intervals of a predetermined angle. The jog dial 303 is actually combined with for example a two-phase type rotary encoder in such a manner that one click corresponds to one rotating step. Thus, the jog dial 303 outputs information that represents the number of rotating steps corresponding to the rotating direction and the rotating angle.

In this case, the jog dial 303 can be pressed in the left direction of FIG. 5B.

The erase key 302 functions as a decision key that causes data reproduced in a particular mode to be erased.

In addition, as shown in FIG. 4A, a photo key 304, a zoom key 305, a focus key 306, and a rear light compensation key 307 are disposed at a side portion of the main body 200 in such a manner that those keys slightly face upwards.

When the photo key 304 is pressed in for example the camera mode, the photo key 304 functions as a shutter for recording a picture file of a still picture.

The zoom key 305 is a switch for operating a zoom state (from the tele side to the wide side) of the lens optical system (camera lens 201).

The focus key 306 is a switch for switching the focus state (for example, normal/infinity, etc.) of the lens optical system. The rear light compensation key 307 is a switch for turning on/off the rear light compensation function.

In addition, as keys for file (track) recording and reproducing operations, a reproduction/pause key 308, a stop key 309, a slow reproduction key 310, search keys 311 and 312, and a record key 313 are disposed at a side portion of the main body 200 corresponding to the movable panel portion 203 as shown in FIG. 4B.

As shown in FIG. 4A, a screen display key 314 and audio volume keys 315 and 316 are disposed at an upper portion of the main body 200. The screen display key 314 is used to display a picture on the display. The audio volume keys 315 and 316 are used to adjust the audio volume of the sound that is output from the speaker.

It should be noted that the appearance of the video camera shown in FIGS. 4A, 4B, 5A, and 5B is just an example. In other words, the appearance may be changed corresponding to operation conditions and so forth required for the video camera according to the embodiment. Of course, the types of switches, operating methods, connection terminals for external devices, and so forth may be varied.

Figure 6A:
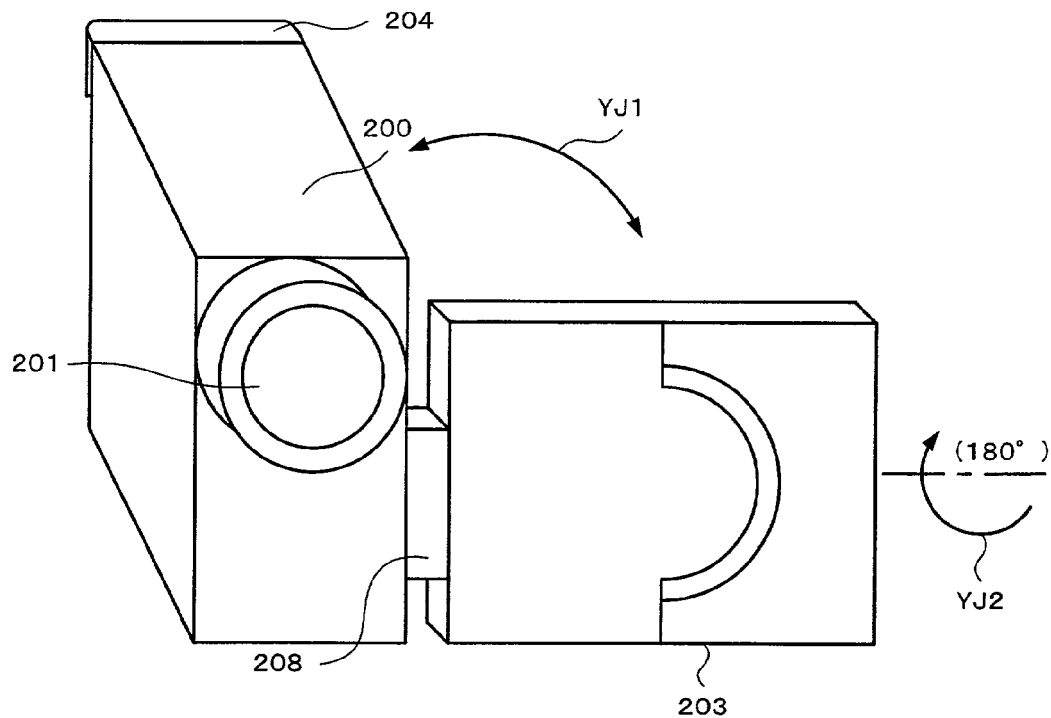
FIG. 6A is a perspective view showing a first state of a movable panel portion.
Figure 6B:
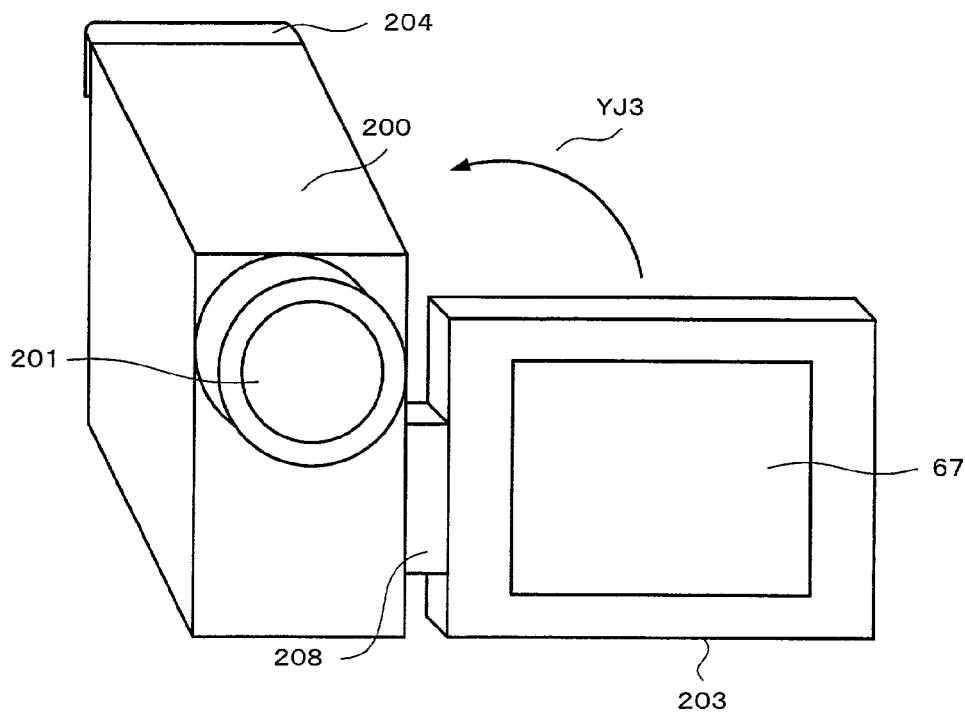
FIG. 6B is a perspective view showing a second state of the movable panel portion.

Next, with reference to FIGS. 6A and 6B, the expansion of the above-mentioned movable panel portion 203 will be described. In FIGS. 6A and 6B, the appearance of the video camera is simplified.

The movable panel portion 203 can be expanded from the state shown in FIG. 4B to the state shown in FIG. 6A in the direction of an arrow YJ1.

In this case, the display screen (display panel 67) orients the photographer side (view finder 204 side). Thus, the display panel 67 almost faces opposite to the camera lens 201 that captures a photographed picture. In the expanded state of the display panel 67 shown in FIG. 6A, the photographer who holds the video camera can photograph (record) a picture while monitoring a photographed picture displayed on the display panel 67.

In addition, the movable panel portion 203 can be rotated from the state shown in FIG. 6A in the direction of an arrow YJ2 in the range of around 180°. In other words, as shown in FIG. 6B, the display panel 67 can be placed in the state of which the display panel 67 faces the object (camera lens) side.

In this state, the user who is on the object side can monitor a photographed picture.

When a disc is attached or detached to/from the disc attaching/detaching portion 205, as shown in FIGS. 6A and 6B, the movable panel portion 203 is expanded from the main body 200.

In addition, the movable panel portion 203 can be moved from the state shown in FIG. 6B in the direction of an arrow YJ3. In that state, while a picture is displayed on the display panel 67, the movable panel portion 203 can be housed in the main body 200 of the video camera.

When the display panel is rotated in the direction of the arrow YJ2, the orientation of the object displayed on the display panel 67 varies depending on whether the display panel 67 faces the photographer side or the object side. According to the embodiment, corresponding to the rotated state of the movable panel portion 203, an inversion display control is performed so that the user (photographer and object) can properly see the display picture on the display panel 67. As a result, such a problem can be solved.

3. Internal Structure of Video Camera

Figure 7:
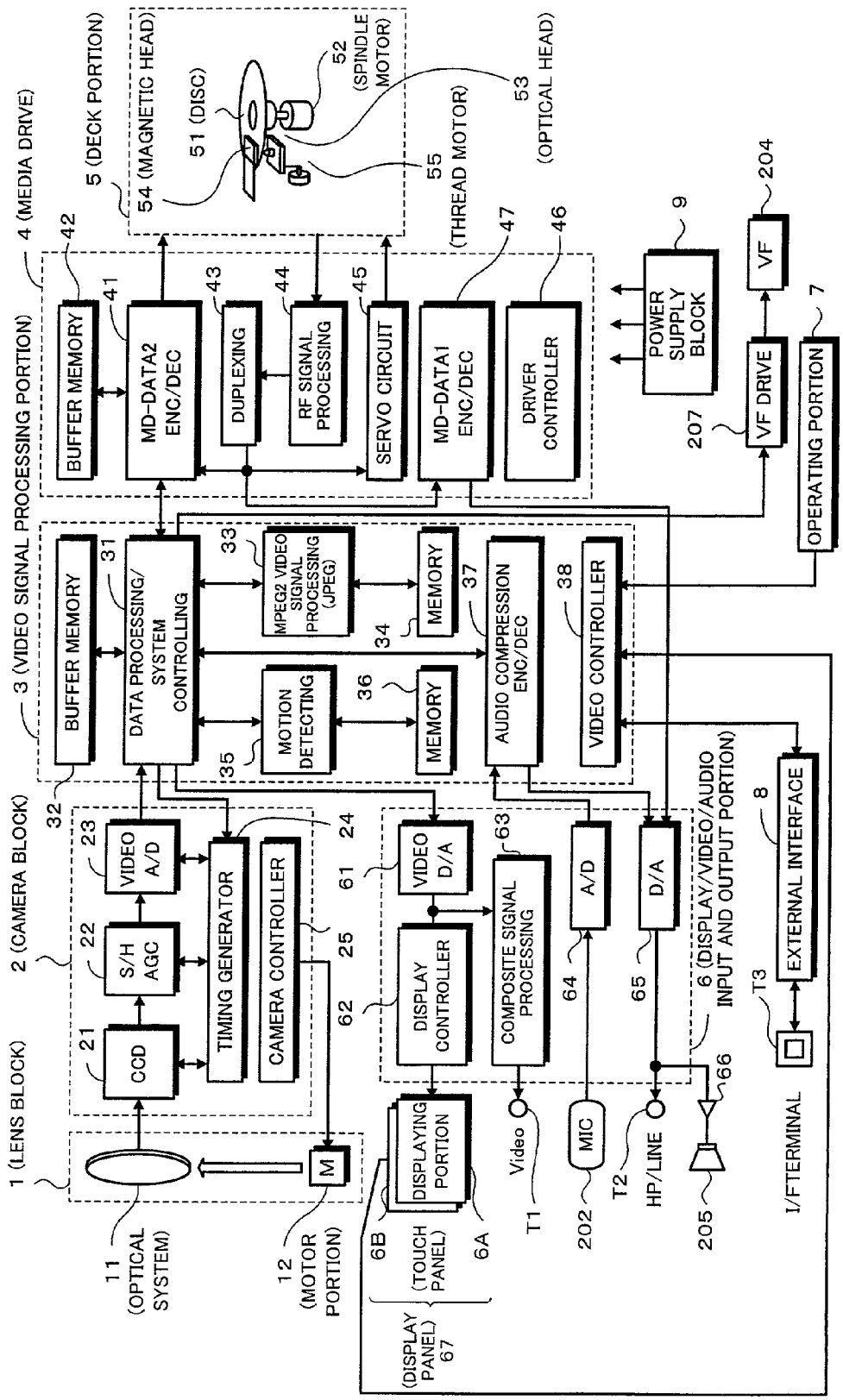
FIG. 7 is a block diagram showing the internal structure of the video camera according to the embodiment.

FIG. 7 is a block diagram showing an example of the internal structure of the video camera according to the embodiment.

Referring to FIG. 7, in a lens block 1, an optical system 11 is disposed. The optical system 11 comprises a photographing lens and a diaphragm. The camera lens 201 shown in FIG. 4B is included in the optical system 11. The lens block 1 has a motor portion 12. The motor portion 12 has a focus motor and a zoom motor. The focus motor is used to perform an auto focus operation for the optical system 11. The zoom motor is used to move the zoom lens corresponding to the operation of the zoom key 304.

A camera block 2 has a circuit portion that mainly converts picture light photographed by the lens block 1 into a digital picture signal.

An optical image of an object that passes through the optical system 11 enters a CCD (Charge Coupled Device) 21 of the camera block 2. The CCD 21 photo-electrically converts the optical image and generates a photographed picture signal. The photographed picture signal is supplied to a sample hold/AGC (Automatic Gain Control) circuit 22. The sample hold/AGC circuit 22 adjusts the gain of the photographed picture signal that is output from the CCD 21 and performs a sample hole process for the photographed picture signal so as to trim the waveform thereof. An output of the camera block 2 is supplied to a video A/D converter 23. The A/D converter 23 converts the analog signal into digital picture signal data.

The timings of the signal processes of the CCD 21, the sample hold/AGC circuit 22, and the video A/D converter 23 are controlled corresponding to a timing signal generated by a timing generator 24. The timing generator 24 inputs a clock signal used for a signal process of a data processing/system controlling circuit 31 (of a video signal processing circuit 3) and generates a predetermined timing signal corresponding to the clock signal. Thus, the timing of the signal process of the camera block 2 is synchronized with the timing of the process of the video signal processing portion 3.

A camera controller 25 executes predetermined controls so that each functional circuit portion of the camera block 2 properly operates. In addition, the camera controller 25 executes controls for the auto focus, automatic exposing adjustment, diaphragm adjustment, zoom, and so forth for the lens block 1.

In the auto focus control, the camera controller 25 controls the rotation angle of the focus motor corresponding to focus control information obtained corresponding to a predetermined auto focus controlling system. Thus, the photographing lens can be driven in the just focus state.

In the record mode, the video signal processing circuit 3 compresses a digital picture signal supplied from the camera block 2 and a digital audio signal collected by the microphone 202. The video signal processing portion 3 supplies the compressed data as user recorded data to a media driving portion 4 disposed downstream thereof. In addition, the video signal processing circuit 3 supplies a digital picture signal received from the camera block 2 and a character image to a view finder driving portion 207. The view finder driving portion 207 displays the digital picture and the character picture supplied from the video signal processing circuit 3.

In the reproduction mode, the video signal processing circuit 3 demodulates user reproduced data (data that is read from a disc 51), namely, compressed picture signal data and audio signal data and outputs them as a reproduced picture signal and a reproduced audio signal.

In the example, it is assumed that the compressing/decompressing system for picture signal data (picture data) of a moving picture and that of a still picture are the MPEG (Moving Picture Experts Group) 2 and the JPEG (Joint Photographic Coding Experts Group), respectively. In addition, it is assumed that the compressing/decompressing system for audio signal data is the ATRAC (Adaptive Transform Acoustic Coding) 2.

The data processing/system controlling circuit 31 of the video signal processing portion 3 mainly executes the compressing/decompressing process for the picture signal data and audio signal data of the video signal processing circuit 3 and a process for inputting/outputting data through the video signal processing portion 3.

The overall controlling process of the video signal processing portion 3 including the data processing/system controlling circuit 31 is executed by a video controller 38. The video controller 38 comprises for example a microcomputer. The video controller 38 can be mutually communicated with the camera controller 25 of the camera block 2 and a driver controller 46 of a media driving portion 4 (that will be described later) through a bus line (not shown).

As a basic operation of the video signal processing circuit 3 in the record mode, the picture signal data is input from the video A/D converter 23 to the data processing/system controlling circuit 31. The data processing/system controlling circuit 31 supplies the input picture signal data to for example a motion detecting circuit 35. Using for example a memory 36 as a work area, the motion detecting circuit 35 performs a picture process such as a motion compensating process for the input picture signal data. Thereafter, the motion detecting circuit 35 supplies the resultant picture signal data to an MPEG2 video signal processing circuit 33.

Using for example a memory 34 as a work area, the MPEG2 video signal processing circuit 33 performs a compression process for the input picture signal data corresponding to the MPEG2 format and outputs a bit stream (MPEG2 bit stream) of compressed data as a moving picture. The MPEG2 video signal processing circuit 33 is structured so as to extract picture data as a still picture from the picture signal data as a moving picture and perform a compression process for the extracted picture data corresponding to the JPEG format. Alternatively, an I picture (Intra Picture) that is normal picture data may be treated as compressed picture data corresponding to the MPEG2 format rather than the JPEG format.

The picture signal data (compressed picture data) that has been compression-encoded by the MPEG2 video signal processing circuit 33 is written and temporarily stored to a buffer memory 32 at a predetermined transfer rate.

In the MPEG2 format, it is clear that as a so-called encoding bit rate (data rate), both the constant velocity (CBR: Constant Bit Rate) and the variable velocity (VBR: Variable Bit Rate) are supported. The video signal processing portion 3 can support the both.

When the video signal processing portion 3 performs a picture compression process at the VBR, the motion detecting circuit 35 detects the motion of picture data in the range from for example earlier and later several ten frames to several hundred frames for each macro block. When the motion detecting circuit 35 detects a motion, the motion detecting circuit 35 sends the detected result as moving vector information to the MPEG2 video signal processing circuit 33.

Using predetermined information such as motion vector information, the MPEG2 video signal processing circuit 33 decides a quantizing coefficient for each macro block so that picture data that has been compression-encoded has a predetermined data rate.

A sound that is collected by for example the microphone 202 is input as audio signal data to an audio compression encoder/decoder 37 through an A/D converter 64 (of a display/video/audio input and output portion 6).

As was described above, the audio compression encoder/decoder 37 performs a compression process for the audio signal data corresponding to the ATRAC2 format. The data processing/system controlling circuit 31 also writes the compressed audio signal data to the buffer memory 32 at a predetermined transfer rate. The buffer memory 32 temporarily stores the compressed audio signal data.

In such a manner, the buffer memory 32 can store the compressed picture data and compressed audio signal data. The buffer memory 32 has a function for absorbing the difference between the data transfer rate of data transferred between the camera block 2 or the display/video/audio input and output portion 6 and the buffer memory 32 and the data transfer rate of data transferred between the buffer memory 32 and a media driving portion 4.

In the record mode, the compressed picture data and compressed audio data stored in the buffer memory 32 are successively read at a predetermined timing and sent to an MD-DATA 2 encoder/decoder 41 of the media driving portion 4. However, in the reproduction mode, the operation for reading data stored in the buffer memory 32 and the operation for recording the data that is read from the buffer memory 32 to the disc 51 through the media driving portion 4 and a deck portion 5 may be intermittently performed.

The write control and the read control for data to the buffer memory 32 are executed by for example the data processing/system controlling circuit 31.

In the reproduction mode, the video signal processing portion 3 can perform the following operation.

In the reproduction mode, compressed picture data and compressed audio data (user reproduced data) that are read from the disc 51 and decoded corresponding to the MD-DATA 2 format by the MD-DATA 2 encoder/decoder 41 (of the media driving portion 4) are sent to the data processing/system controlling circuit 31.

The data processing/system controlling circuit 31 temporarily stores the compressed picture data and compressed audio data that have been input to the buffer memory 32. The data processing/system controlling circuit 31 reads the compressed picture data and compressed signal data from the buffer memory 32 at a predetermined timing and a predetermined transfer rate so that the reproduction time axes thereof match. The data processing/system controlling circuit 31 supplies the compressed picture data and the compressed audio data to the MPEG2 video signal processing circuit 33 and the audio compression encoder/decoder 37, respectively.

The MPEG2 video signal processing circuit 33 performs a decompression process for the compressed picture data that has been input and sends the resultant data to the data processing/system controlling circuit 31. The data processing/system controlling circuit 31 supplies the decompressed picture signal data to a video D/A converter 61 (of the display/video/audio input and output portion 6).

The audio compression encoder/decoder 37 performs a decompression process for the compressed audio signal data that has been input and supplies the decompressed audio signal data to a D/A converter 65 (of the display/video/audio input and output portion 6).

In the display/video/audio input and output portion 6, the video D/A converter 61 converts the input picture signal data into an analog picture signal and supplies the analog picture signal to both a display controller 62 and a composite signal processing circuit 63.

The display controller 62 drives a displaying portion 6A corresponding to the input picture signal. The displaying portion 6A displays a reproduced picture. The displaying portion 6A can display not only a picture reproduced from the disc 51, but a picture photographed by the camera portion composed of the lens block 1 and the camera block 2 on almost real time basis.

As was described above, the displaying portion 6A displays messages with characters and so forth corresponding to the operation of the video camera as well as a reproduced picture and a photographed picture. Such a message is generated by the video controller 38. The video controller 38 combines picture signal data such as predetermined characters to picture signal data that is output from the data processing/system controlling circuit 31 to the video D/A converter 61 so that the predetermined characters are displayed at a predetermined position.

The displaying portion 6A and a touch panel 6B compose the display panel 67.

Position information at which a pressing operation is performed on the displaying portion 6A is detected by the touch panel 6B. The touch panel 6B outputs the position information as operation information to the video controller 38.

The composite signal processing circuit 63 converts the analog picture signal supplied from the video D/A converter 61 into a composite signal and outputs the composite signal to a video output terminal T1. When the video camera is connected to an external monitor device or the like through the video output terminal T1, a picture reproduced by the video camera can be displayed on the external monitor device.

In the display/video/audio input and output portion 6, the D/A converter 65 inputs audio signal data from the audio compression encoder/decoder 37, converts the audio signal data into an analog audio signal, and outputs the analog audio signal to a headphone/line terminal T2. The analog audio signal that is output from the D/A converter 65 is also output to a speaker 205 through an amplifier 66. The speaker 205 outputs a reproduced sound or the like.

Mainly, in the record mode, the media driving portion 4 encodes data that is recorded corresponding to the MD-DATA 2 format for the disc and sends the encoded data to a deck portion 5. In the reproduction mode, the deck portion 5 performs a decode process for data that is read from the disc 51, obtains reproduced data, and sends it to the video signal processing portion 3.

In the record mode, an MD-DATA 2 encoder/decoder 41 of the media driving portion 4 inputs data that is recorded (compressed picture data+compressed audio data) from the data processing/system controlling circuit 31, encodes the data corresponding to the MD-DATA 2 format, and temporarily stores the encoded data to a buffer memory 42. While reading data at a predetermined timing, the MD-DATA 2 encoder/decoder 41 sends the data to the deck portion 5.

In the reproduction mode, the MD-DATA 2 encoder/decoder 41 decodes a digital signal that is read from the disc 51 and input through an RF signal processing circuit 44 and a digitizing circuit 43 corresponding to the MD-DATA 2 format and sends the decoded data as reproduced data to the data processing/system controlling circuit 31 of the video signal processing portion 3.

When necessary, the reproduced data is temporarily stored to the buffer memory 42. At a particular timing, the reproduced data is read from the buffer memory 42 and sent to the data processing/system controlling circuit 31. The writing control and the reading control for the data to the buffer memory 42 is executed by the driver controller 46.

In the reproduction mode, in the case that a servo control does not work due to a disturbance or the like and thereby a signal cannot be read from the disc 51, while data that is read from the disc 51 is stored in the buffer memory 42, when the reproducing operation for the disc is resumed, the chronological continuity of the reproduced data can be maintained.

The RF signal processing circuit 44 performs a predetermined process for a signal that is read from the disc 51 so as to generate an RF signal as reproduced data and servo control signals such as a focus error signal and a tracking error signal for controlling the servo control of the deck portion 5. The RF signal is supplied to the digitizing circuit 43. The digitizing circuit 43 digitizes the RF signal and inputs the digitized signal as digital signal data to the MD-DATA 2 encoder/decoder 41.

The generated servo control signals are supplied to a servo circuit 45. The servo circuit 45 executes a predetermined servo control for the deck portion 5 corresponding to the input servo control signals.

In the example, an encoder/decoder 47 corresponding to the MD-DATA 1 format is disposed. The encoder/decoder 47 encodes data supplied from the video signal processing portion 3 corresponding to the MD-DATA 1 format and records the encoded data to the disc 51. Alternatively, when data that is read from the disc 51 has been encoded corresponding to the MD-DATA 1 format, the encoder/decoder 47 decodes the data and outputs the decoded data to the video signal processing portion 3. The video camera according to the embodiment is structured so that it has compatibility with both the MD-DATA 2 format and the MD-DATA 1 format.

The driver controller 46 is a functional circuit portion that totally controls the media driving portion 4.

The deck portion 5 is a portion composed of a mechanism that drives the disc 51. The deck portion 5 can attach and detach the disc 51. The deck portion 5 has a mechanism (disc slot 203, see FIG. 4B) that allows the user to change the disc 51. The disc 51 is a magneto-optical disc corresponding to the MD-DATA 2 format or the MD-DATA 1 format.

In the deck portion 5, a spindle motor 52 that rotates the attached disc 51 at the CLV. In the record/reproduction mode, an optical head 53 radiates laser light to the disc 51.

In the record mode, the optical head 53 outputs a high level laser that heats a record track until the Curie temperature. In the reproduction mode, the optical head 53 outputs a relatively low level laser for detecting data with reflected light corresponding to the magneto-optic Kerr effect. To do that, the optical head 53 has an optical system and a detector. The optical system comprises a laser diode (as a laser output means), a polarization beam splitter, and an objective lens. The detector detects the reflected light. The objective lens of the optical head 53 is held by a two-axes mechanism so that the object lens can be moved in the disc radius direction (tracking direction) and the disc near/far direction (focus direction).

A magnetic head 54 is disposed on the opposite side of the disc 51 in such a manner that the disc 51 is sandwiched by the optical head 53 and the magnetic head 54. The magnetic head 54 applies a magnetic field modulated by record data to the disc 51.

The deck portion 5 also has a thread mechanism driven by a thread motor 55. By the thread mechanism, the entire optical head 53 and the magnetic head 54 can be moved in the disc radius direction.

An operating portion 7 corresponds to each switch shown in FIGS. 4A and 4B. Various operation information of operations performed by the user with those switches is output to for example the video controller 38.

The video controller 38 supplies control information that causes each portion to execute an operation corresponding to operation information that is output from the touch panel 6B and the operating portion 7 to the camera controller 25 and the driver controller 46.

An external interface 8 is disposed so that data can be exchanged between the video camera and an external device. For example, as shown in the drawing, the external interface 8 is disposed between an I/F terminal T3 and the video signal processing portion. The external interface 8 is not limited to a particular type. In this example, the external interface 8 may be for example the IEEE 1394 interface.

When an external digital video device and the video camera according to the embodiment as an example are connected through the I/F terminal T3, a picture (sound) photographed by the video camera can be recorded to the external digital video device. When picture (audio) data or the like that is reproduced by the external digital video device is captured through the external interface 8, the captured picture data can be recorded to the disc 51 corresponding to the MD-DATA 2 format (or the MD-DATA 1 format). In addition, character information for a caption or the like can be captured and recorded as a file.

A power supply block 9 supplies a predetermined power supply voltage to each functional circuit portion using a DC power supply obtained from a built-in battery or a DC power supply generated by a commercial AC power supply. The power on/off operation of the power supply block 9 is controlled by the video controller 38 corresponding to the operation of the main dial 300.

In the record mode, the video controller 38 executes a lighting operation for an indicator 206.

4. Structure of Media Driving Portion

Figure 8:
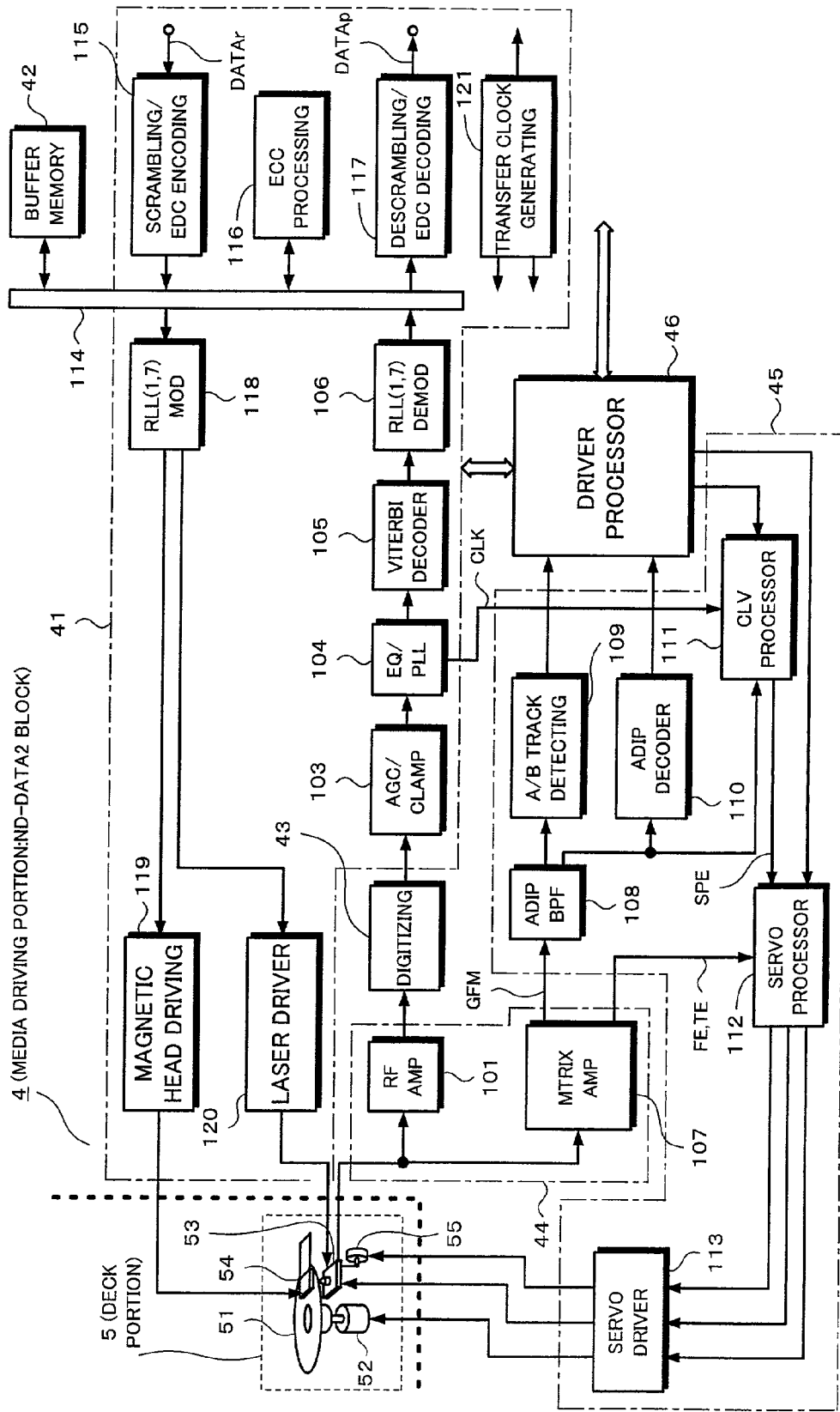
FIG. 8 is a block diagram showing the internal structure of a media driving portion of the video camera according to the embodiment.

Next, the detailed structure of a functional circuit portion corresponding to the MD-DATA 2 format in the media driving portion 4 shown in FIG. 7 will be described with reference to a block diagram shown in FIG. 8. FIG. 8 shows the deck portion 5 along with the media driving portion 4. Since the internal structure of the deck portion 5 has been described with reference to FIG. 7, similar portions are denoted by similar reference numerals and their description is omitted. In FIG. 8, for the media driving portion 4, similar portions to those in FIG. 7 are denoted by similar reference numerals.

Information (an optical current detected as laser reflected light by the photo detector) detected as a data reading operation of the optical head 53 against the disc 51 is supplied to an RF amplifier 101 of the RF signal processing circuit 44.

The RF amplifier 101 generates a reproduced RF signal as a reproduced signal with the detected information that is input and supplies the generated signal to the digitizing circuit 43. The digitizing circuit 43 digitizes the reproduced RF signal that is input and obtains a digitized RF signal as a digital signal.

The digitized RF signal is supplied to the MD-DATA 2 encoder/decoder 41. In the MD-DATA 2 encoder/decoder 41, an AGC/clamping circuit 103 adjusts the gain and performs a clamp process for the digitized RF signal. The resultant signal is input to an equalizer/PLL circuit 104.

The equalizer/PLL circuit 104 performs an equalizing process for the input digitized RF signal and outputs the resultant signal to a Viterbi decoder 105. In addition, the equalizer/PLL circuit 104 inputs the equalized digitized RF signal to a PLL circuit. The PLL circuit extracts a clock CLK that synchronizes with the digitized RF signal (RLL (1, 7) code sequence).

The frequency of the clock CLK corresponds to the disc rotating velocity. Thus, a CLV processor 111 inputs the clock CLK from the equalizer/PLL circuit 104, compares the clock CLK with a reference value corresponding to a predetermined CLV (see FIG. 3), and obtains error information. The error information is used as a signal component for generating a spindle error signal SPE. The clock CLK is used for processes of an RLL (1, 7) demodulating circuit 106 and a predetermined signal processing circuit system.

The Viterbi decoder 105 performs a decode process for the digitized RF signal that is input from the equalizer/PLL circuit 104 corresponding to the so-called Viterbi decoding method and obtains reproduced data as an RLL (1, 7) code sequence.

The reproduced data is input to the RLL (1, 7) demodulating circuit 106. The RLL (1, 7) demodulating circuit 106 demodulates the reproduced data corresponding to the RLL (1, 7) code sequence.

The data stream demodulated by the RLL (1, 7) demodulating circuit 106 is written to the buffer memory 42 through a data bus 114 and expanded to the buffer memory 42.

An ECC processing circuit 116 performs an error correction process for the data stream expanded in the buffer memory 42 for each error correction block corresponding to the RS-PC system. In addition, a descrambling/DEC decoding circuit 117 performs a descramble process and an EDC decode process (error detection process) for the data stream.

The resultant data becomes reproduced data DATAp. The reproduced data DATAp is sent from for example the descrambling/DEC decoding circuit 117 to the data processing/system controlling circuit 31 of the video signal processing portion 3 at a transfer rate corresponding to the transfer clock generated by a transfer clock generating circuit 121.

The transfer clock generating circuit 121 is a portion that generates a transfer clock with a proper frequency (data transfer rate) necessary for data transferred between the media driving portion 4 and the video signal processing portion 3 and data transferred between two functional circuit portions of the media driving portion 4 using a clock generated by for example a crystal oscillator.

The transfer clock generating circuit 121 generates a clock with a predetermined frequency supplied to each functional circuit portion of the media driving portion 4 and the video signal processing portion 3 corresponding to the operation state of the video camera.

Detected information (optical current) that is read from the disc 51 by the optical head 53 is also supplied to a matrix amplifier 107.

The matrix amplifier 107 performs a predetermined calculation process for the input detected information and extracts a tracking error signal TE, a focus error signal FE, groove information (absolute address information recorded as a wobbled groove WG on the disc 51) GFM, and so forth from the input detected information, and supplies the extracted signals and information to the servo circuit 45. In other words, the extracted tracking error signal TE and focus error signal FE are supplied to a servo processor 112. On the other hand, the groove information GFM is supplied to an ADIP band pass filter 108.

The groove information GFM that has been band-passed by the ADIP band pass filter 108 is supplied to an A/B track detecting circuit 109, an ADIP decoder 110, and the CLV processor 111.

The A/B track detecting circuit 109 determines which of the track Tr•A and track Tr•B is being currently traced corresponding to the input groove information GFM in the method shown in FIG. 2B. The A/B track detecting circuit 109 outputs the determined track information to the driver controller 46. In addition, the ADIP decoder 110 decodes the input groove information GFM and extracts an ADIP signal as absolute address information of the disc and outputs the ADIP signal to the driver controller 46. The driver controller 46 executes a predetermined control process corresponding to the determined track information and the ADIP signal.

The CLV processor 111 inputs the clock CLK from the equalizer/PLL circuit 104 and the groove information GFM through the ADIP band pass filter 108. The CLV processor 111 generates the spindle error signal SPE for the CLV servo control corresponding to the error signal obtained by integrating the phase difference between the groove information GFM and the clock CLK. The CLV processor 111 outputs the generated spindle error signal SPE to the servo processor 112. An operation executed by the CLV processor 111 is controlled by the driver controller 46.

The servo processor 112 generates various servo control signals (a tracking control signal, a focus control signal, a thread control signal, a spindle control signal, and so forth) corresponding to the tracking error signal TE, the focus error signal FE, and the spindle error signal SPE and corresponding to a track jump instruction, an access instruction, and so forth and outputs the generated signals to a servo driver 113.

The servo driver 113 generates predetermined servo drive signals corresponding to the servo control signals supplied from the servo processor 112. In this example, the servo drive signals are two-axes drive signals (focus direction and tracking direction) for driving the two-axes mechanism, a thread motor driving signal for driving the thread mechanism, and a spindle motor drive signal for driving the spindle motor 52.

Since the servo drive signals are supplied to the deck portion 5, the focus control and the tracking control for the disc 51 and the CLV control for the spindle motor 52 are performed.

When the recording operation is executed for the disc 51, for example record data DATAr that is recorded is input from the data processing/system controlling circuit 31 of the video signal processing portion 3 to a scrambling/EDC encoding circuit 115. The user record data DATAr is input in synchronization with for example the transfer clock (data transfer rate) generated by the transfer clock generating circuit 121.

The scrambling/EDC encoding circuit 115 writes and expands the record data DATAr to the buffer memory 42 so as to perform a data scramble process and an EDC encode process (an error detected code adding process corresponding to a predetermined system). Thereafter, for example an ECC processing circuit 116 adds error correction code corresponding to the RS-PC system to the record data DATAr expanded in the buffer memory 42.

The resultant record data DATAr is read from the buffer memory 42 and supplied to an RLL (1, 7) modulating circuit 118 through a data bus 114.

The RLL (1, 7) modulating circuit 118 performs an RLL (1, 7) modulation process for the input record data DATAr and outputs record data as an RLL (1, 7) code sequence to a magnetic head driving circuit 119.

In the MD-DATA 2 format, the so-called laser strobe magnetic field modulation system is used as a recording system for the disc. The laser strobe magnetic field modulation system is a recording system for applying the magnetic field modulated corresponding to record data to the disc record surface and emitting pulse light in synchronization with the record data.

In such a laser strobe magnetic field modulating system, the process for forming a pit edge recorded on the disc does not depend on the transit characteristics such as inversion velocity of the magnetic field, but the timing of the radiation of laser pulses.

Thus, in comparison with for example a simple magnetic field modulation system (of which laser light is constantly radiated to a disc and a magnetic field modulated corresponding to record data is applied to the record surface of the disc), in the laser strobe magnetic field modulating system, the jitter of record pits can be remarkably decreased. In other words, the laser strobe magnetic field modulating system is suitable for a high density recording system.

A magnetic head driving circuit 119 of the media driving portion 4 operates so that a magnetic field modulated corresponding to input record data is applied from the magnetic head 54 to the disc 51. In addition, the RLL (1, 7) modulating circuit 118 outputs a clock that synchronizes with the record data to a laser driver 120. The laser driver 120 drives a laser diode of the optical head 53 so that laser pulses synchronized with record data generated as the magnetic field by the magnetic head 54 are radiated to the disc. At that point, the laser pulses emitted from the laser diode corresponds to a predetermined laser power for recording data. In such a manner, the recording operation corresponding to the laser strobe magnetic field modulation system can be performed by the media driving portion 4.

5. Example of Disc Structure Corresponding to Embodiment

Next, an example of the data structure of the disc 51 according to the embodiment will be described.

First of all, data units referred to as sector and cluster in the MD-DATA 2 format will be described.

A sector is the minimum unit of which data is physically read from a disc. Each sector is assigned a PSA (Physical Sector Address).

A cluster is the minimum unit of which data is physically written to a disc. One cluster is composed of a group of 16 sectors whose PSAs are 0h to Fh. Each cluster is assigned a PCA (Physical Cluster Address). A sector at the lead-in area that is a pre-mastered area (that will be described later) can be identified with a PCA. There are two clusters with the same PCA on the track Tr•A and track Tr•B.

Figure 9:
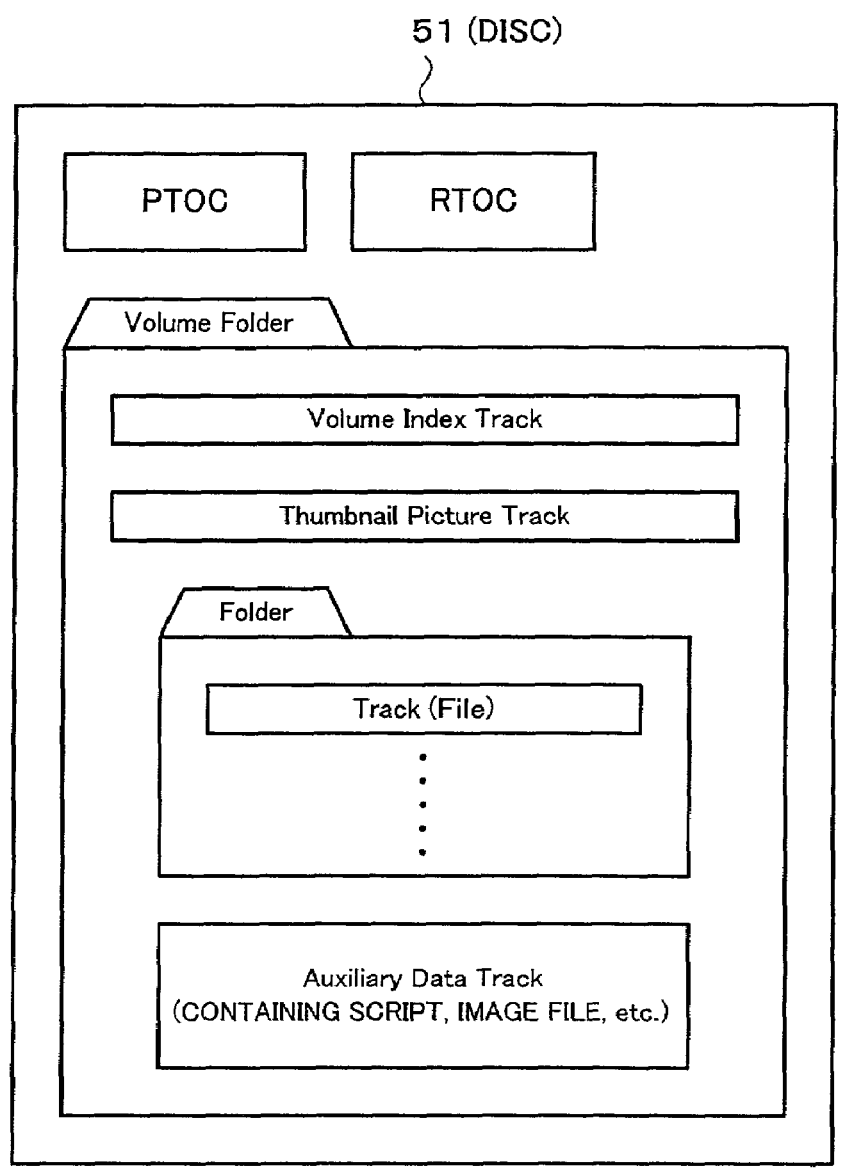
FIG. 9 is a schematic diagram showing the concept of an example of the data structure of the disc according to the embodiment.

FIG. 9 shows the concept of an example of the data management of the disc 51 according to the embodiment. The physical format of the disc 51 shown in FIG. 9 is the same as that shown in FIGS. 2A and 2B.

On the disc 51, a PTOC and an RTOC are formed as management information. The PTOC contains predetermined management information with pits. The content of the PTOC cannot be rewritten.

The RTOC contains basic information necessary for managing data recorded on the disc.

In this example, the RTOC contains information for managing tracks (may be synonym of files) and folders (that are structures for managing tracks as groups) in the record and reproduction modes.

The content of the RTOC is often rewritten corresponding to data recorded on the disc and the result of the editing process such as an erasing process for a track (file) or a folder.

User data is managed as a volume folder placed in one root folder. In the embodiment, a volume is defined as a complete set of user data. It is defined that one disc contains only one volume. Data contained in the volume is placed in the volume folder, other folders, and tracks except for information managed by the PTOC and the RTOC.

In the volume folder, a volume index track (VIT) having a predetermined size (for example, 12 clusters) is placed.

The PTOC and the RTOC are defined as main management information. On the other hand, the volume index track is defined as an area for sub management information. The volume index track has a table that contains properties of tracks (files), folders, and auxiliary data, titles thereof, and information for managing packet data that compose tracks.

As a track managed in the volume folder, a thumbnail picture track can be optionally placed.

According to the embodiment, one still picture with a predetermined resolution can be stored as a thumbnail picture corresponding to each file recorded on the disc. A thumbnail picture can be treated as an alternative picture that allows the user to visually recognize a file.

A thumbnail track contains correlation information with a file (track) recorded on the disc and index information of the location of a thumbnail picture. The data length of the thumbnail track can be extended corresponding to the number of thumbnail pictures recorded on the disc.

Video/audio data that is for example photographed by the user and recorded on the disc is managed in the unit of a file. The video/audio data is placed as a track below the volume folder. Alternatively, video/audio data is placed in a folder below the volume folder.

FIG. 9 shows the state that one file is represented as one track and the track is stored in one folder. As was described above, a folder is a structure of which tracks or sub folders are managed as one group.

Below the volume folder, any number of tracks and any number of folders can be stored in the range of up to the maximum number of tracks and up to the maximum number of hierarchical levels of folders.

The volume folder also contains an auxiliary data track that stores auxiliary data.

Information stored in the auxiliary data track depends on for example an application that is actually used.

According to the embodiment, script information as the reproduction control information is stored. Picture data (image) that is superimposed with picture data that is created by "scribble edit" for a track (recorded file) is also stored in the auxiliary data track.

The above-described PTOC and RTOC and information stored in the volume index track (they together are referred to as "management information") are read from a disc when it is attached to the video camera. For example, such information is stored to a predetermined area of the buffer memory 42 of the media driving portion 4 (or the buffer memory 32). In the record mode and edit mode, the management information stored in the buffer memory is rewritten corresponding to the record result and edit result. Thereafter, at a particular timing, the management information of the disc 51 is rewritten and updated corresponding to the content of the management information stored in the buffer memory (however, the PTOC is not updated).

FIG. 10 shows the relation between the data management structure shown in FIG. 9 and the physical structure of the disc 51.

In FIG. 10, a lead-in area is a pit area on the innermost periphery of the disc. The lead-in area contains information of the PTOC.

A recordable area is formed as an outer periphery of the lead-in area through a transition area. The recordable area is a magneto-optical record area to and from which data can be magneto-optically recorded and reproduced. As was described with reference to FIGS. 1, 2A, and 2B, two tracks Tr•A and Tr•B are formed in a double spiral shape.

On the innermost periphery of the recordable area, RTOC areas are formed on both the track Tr•A and track Tr•B. In the RTOC area on the track Tr•A, information of the RTOC of four clusters is repeatedly recorded three times. After the information of the RTOC, a volume index track of 12 clusters is placed.

After the volume index track, a thumbnail track can be optionally placed on the disc 51. The thumbnail track in the RTOC area contains at least the first cluster of a file. As the number of files becomes large, the amount of thumbnail picture data increases. When the amount of thumbnail picture data exceeds the record capacity of the thumbnail track in the ROTC area, the data that is not recorded in the thumbnail track is additionally recorded to a recordable data area (that will be described later). In this case, the thumbnail track in the recordable data area is managed on the volume index track (or the RTOC).

After the thumbnail track in the RTOC area, an area for a script and an area for image data as auxiliary data can be optionally placed on the disc 51.

When the amount of the script data and the image data exceeds the record capacity of the RTOC area, the script data and the image data that are not recorded in the RTOC area can be additionally recorded to the recordable data area in such a manner that they are managed on the volume index track (or the RTOC).

The recordable data area starts from an address position denoted by recordable data area start address W. The recordable data area contains AV data—namely, data of tracks (files). In addition, the recordable data area contains thumbnail picture data and auxiliary data.

After the recordable data area, a lead-out area is formed from an address position denoted by a lead-out area start address L to the outermost periphery.

The above-described area allocation is dedicated for the track Tr•A. However, as is clear from FIG. 10, the above-described area allocation is also applied for the track Tr•B. However, currently, the RTOC area for the track Tr•B has not been defined. In other words, the RTOC area is substantially used for only the track Tr•A.

It should not be noted that the disc structure described with reference to FIGS. 9 and 10 is just an example. In other words, the physical locations of individual areas on the disc may be varied corresponding to actual operation conditions of the video camera. In addition, the data structure can be changed.

6. Data End Position Change Editing Operation 6-1. Outline of Operation 1 (in the Case of Camera Mode)

In the video camera according to the embodiment, as an easy editing function, a data portion after a particular position of the last track of data managed in the unit of a file (track) on the disc can be erased. This operation is referred to as data end position change editing operation.

The data end position change editing function is performed for a camera mode track that contains video data of a moving picture (or still picture data) photographed in the camera mode and an interview track that contains sound/still picture data recorded in the interview mode as a file recorded on the disc.

In the data end position change editing operation, the main dial 300 is placed in the camera mode position or the interview mode position. In addition, when data can be recorded to a camera mode track or an interview track, the data end position change editing operation can be performed.

First of all, with reference to FIGS. 11A to 11D, the process and operation for changing the data end position in the case that the main dial 300 is placed in the camera mode position will be described.

As was described above, in the camera mode, when the release key 301 or the photo key 304 is operated, the video camera enters the mode in which video data of a moving picture or a still picture can be recorded.

According to the embodiment, in the camera mode, the reproduction/pause key 308 can be operated. When the reproduction/pause key 308 is operated, the last track (with the last track number) is selected from tracks recorded on the disc.

Since the camera mode has been selected, the last track of the camera mode track recorded on the disc in the camera mode is selected. In other words, interview mode tracks recorded in the interview mode and tracks recorded or created in other than the camera mode are not selected.

The last camera mode track that has been selected in the above-described manner is reproduced.

In other words, as shown in FIG. 11A, data is reproduced from a start address A1 of the last track. A picture of the last track reproduced in such a manner is displayed on the display panel 67. The user can see the picture of the last track on the display panel 67. At that point, a sound recorded through a microphone along with a moving picture is reproduced in synchronization with the moving picture.

In FIG. 11A, an area after an address A3 preceded by an end address A2 of the last track is a blank area.

While data is being reproduced from the last track, the user can pause the reproducing operation at his or her desired position of the last track. To perform the pausing operation, the user may operate the reproduction/pause key 308 again. The user selects the pause position as the data end position that he or she desires. In other words, the pause position corresponds to the start position of a data portion that the user wants to erase.

The position at which the reproduction is paused by the pausing operation performed by the user is denoted by a pose position Pst1 in FIG. 11A.

When the user has performed the pausing operation, a picture that was displayed before the pausing operation is displayed as a still picture on the display panel 67. In other words, a picture of data corresponding to the pause position Pst1 shown in FIG. 11A is displayed as a still picture on the display panel 67. In the state, when the jog dial 303 is rotated, a picture is displayed frame by frame starting from the pause position Pst1 shown in FIG. 11A corresponding to the rotating direction of the jog dial 303.

When the frame-by-frame reproducing operation is considered in the relation between the data and the pause position, as shown in FIG. 11B, the pause position Pst1 corresponding to the initial pause position is changed to a pause position Pst2 corresponding to the rotating operation of the jog dial 303.

While seeing a picture on the display screen, the user changes the pause position Pst1. Finally, the user can finely adjust the pause end position that he or she wants to change.

In such a manner, it is assumed that the user has finely adjusted the pause position and finally designated the pause position Pst2 (in this example, the last pause position pst2 may become Pst1). Thereafter, the user operates the erase key 302.

When the user operates the erase key, the video camera reproduces data in the area from the final pause position pst2 to the end address A2 of the last track as shown in FIG. 11C so that the user can check the data end position that he or she wants to change. At that point, the video camera outputs reproduced picture/sound. The data in the area is a data portion that is erased. The data in the area is repeatedly reproduced.

The user sees the repeatedly reproduced picture on the display panel 67. Thus, the user can check the picture that he or she wants to erase.

At that point, a dialog that allows the user to decide the erasing operation or cancel it is displayed on the display screen. The user performs the deciding operation with the dialog by rotating and pressing the jog dial 303. The dialog displays two buttons that are a cancel button and an erase decision button. The user can select one of the two buttons by rotating the jog dial 303. To click a button (perform the deciding operation), the user presses the jog dial 303.

When the user wants to cancel the designated start position of the data portion that is erased (namely, the final pause position Pst2), he or she performs a canceling operation with the dialog. Thus, the video camera cancels the designated start position of the data portion and enters the record standby state in the normal camera mode.

On the other hand, when the user decides the designated start position of the data portion that is erased, he or she performs the erasing operation with the dialog.

When the user decides the designated start position of the data portion that is erased, the data area of the last track is changed from the start address A1 to an end address A2-1 as shown in FIG. 11D. In other words, the end address of the last track is changed from the address A2 shown in FIGS. 11A and 11C to the address A2-1 that is immediately followed by an address designated with the final pause position Pst2 followed by the address A2 shown in FIG. 11D.

At that point, for example management information is changed so that the changed end address A2-1 becomes the end address of the last track. According to the embodiment, at least the contents of the RTOC and the volume index track are updated. When a script file corresponding to the last track is recorded on the disc and the content of the script file should be changed corresponding to the change of the last address, the script file is also updated.

As described above, after the end address of data is changed, as shown in FIG. 11D, an area after the address A2-2 immediately preceded by the address A2-1 is managed as a blank area. Thus, when the video camera reproduces the last track, it stops the reproduction of the last track at the end address A2-1.

On the disc, data of the original last track is left in the area from the address A2-2 to A2 shown in FIG. 11D. However, the area is managed as a blank area.

After the end address of data has been changed in such a manner, when a track is newly recorded in the camera mode, before the end address of the data is changed, the last track is managed as a track immediately followed by the newly recorded track. The newly recorded track becomes the last track. When the two tracks are successively reproduced, the area from the start address A1 to the end address A2-1 is reproduced as a track immediately followed by the last track. Thereafter, the newly recorded last track is reproduced as the last track.

In other words, according to the embodiment, when the data end position (end address) is changed, an area after any desired data position of the last track is erased in the camera mode. Thereafter, a new track is recorded as the last track. At that point, when the user properly selects a data position of the last track (pause position Pst1), he or she can easily perform a picture connecting and editing operation.

When the user erases a data portion after the pause position Pst1 of the last track, he or she can easily erase the data by simple operations of a reproduction pausing operation and an erase key operation except for additional operations that are frame-by-frame reproducing operation and cancel deciding/erase deciding operation in consideration of user friendliness and safety against mistaken data erase.

In this case, the data end position represents the data end position of each track. However, in this case, since an object track of which the data end position is changed is the last track, the data end position is the end position of user data (that is limited to data of a camera mode track).

In addition, in this case, the area from the designated pause position Pst2 to the end address A2 is an object that is erased. Alternatively, the pause position Pst2 may be designated as the end address A2-1.

In the case of a picture, since the pause position is designated in the unit of a frame, the end address A2-1 is the end address of a picture one frame prior to the picture designated by the pause position Pst2.

6-2. Outline of Operation 2 (in the Case of Interview Mode)

Next, with reference to FIGS. 12A to 12D, the process and operation in the case that a data end position is changed in the interview mode position of the main dial 300 will be described. As will be described later, the process and operation in the case that a data end position is changed in the interview mode is the same as those in the camera mode described with reference to FIGS. 11A to 11D.

In the interview mode, when the user operates the record key 313, a sound collected by the microphone 202 is recorded. While the sound of the microphone is being recorded, when the user operates the photo key 304 (or the release key 301), a still picture is recorded. When data is reproduced from an interview track in the reproduction/edit mode, the video camera reproduces a sound and displays still pictures at timings of which they have been recorded.

When the user operates the reproduction/pause key 308 in the interview mode, the last track is selected from tracks recorded on the disc.

At that point, in the interview mode, as the last track, the last track is selected from interview mode tracks recorded in the interview mode.

As shown in FIG. 12A, data of the last interview track is reproduced. At that point, a reproduced sound of the interview track is output. In addition, still pictures are displayed at timings of which they have been recorded. For example, in the case shown in FIG. 12A, the last interview track contains a still picture 1 and a still picture 2. After data of the last interview track is reproduced, the still picture 1 is displayed at reproduction time t1. The still picture 2 is displayed at reproduction time t2. In this case, the still picture 2 is continuously displayed until the end of the track.

Likewise, in FIG. 12A, an area after an address A3 immediately preceded by an end address A2 of the last track is a blank area.

In this case, the user can perform a pausing operation at his or her desired position of the last track. When the user performs the pausing operation at a pause position Pst1 shown in FIG. 12A, the output of the reproduced sound is paused. In addition, when a still picture was displayed before the pausing operation is performed, the still picture is repeatedly displayed. In the case shown in FIG. 12A, when the pausing operation was performed, since the still picture 2 was displayed, the still picture 2 is displayed on the display panel 67.

In the interview mode, when the jog dial 303 is rotated, the sound is also reproduced for each sound element. In other words, at the pause position Pst1 shown in FIG. 12B, an address of audio data is changed.

When the pause position Pst1 is changed by the element-by-element sound reproducing operation (not shown), if a still picture changes corresponding to an address of the pause position Pst1, the changed still picture is displayed.

After the user has adjusted the pause position Pst and finally designated a pause position Pst2, when the user operates the erase key 302, as shown in FIG. 12C, the video camera repeatedly reproduces audio data in the area from the final pause position pst2 to the end address A2 of the last track. When this area contains a still picture, the video camera also outputs the still picture. In the example shown in FIG. 12C, the video camera displays the still picture 2 in addition to reproducing the sound. In this case, data in the area repeatedly reproduced is a data portion that is erased.

A dialog is displayed on the display screen. The dialog displays two buttons that are a cancel button and an erase decision button. The user operates the cancel button and the erase decision button by rotating and pressing the jog dial 303.

When the user operates the cancel button, the video camera cancels the designated area and enters the record standby state in the regular camera mode.

On the other hand, when the user operates the erase decision button, as shown in FIG. 12D, the area of data of the last track is changed to an area from the start address A1 to the end address A2-1. Thereafter, for example management information (the RTOC, the volume index track, the script file, and so forth) is updated so that the changed end address A2-1 becomes the end address of the last track.

As a result, as shown in FIG. 12D, an area after the address A2-2 immediately preceded by the address A2-1 is managed as a blank area. When data of the last track is reproduced, a sound is reproduced from the address A1. Thereafter, the still picture 1 is displayed from the reproduction time t1 to the reproduction time t2. At the end address A2-1, the reproduction of the still picture 2 is completed.

6-3. Process

Next, the process for accomplishing the data end position changing operation will be described with reference to a flow chart shown in FIG. 13.

In this example, the process in the camera mode (see FIGS. 11A to 11D) will be described. In the process shown in FIG. 13, the video controller 38 functions as a master controller. When necessary, the data processing/system controlling circuit 31, the camera controller 25, the driver controller 46, and so forth perform respective control processes so as to accomplish the process for the data end position changing operation. In the following description, the individual controllers are simply referred to as controller.

At step S101, the camera mode is designated. At step S102, the controller determines whether or not the user has performed a recording operation. When the determined result at step S102 is No, the flow advances to step S103. At step S103, the controller determines whether or not the user has performed a reproducing operation. When the determined result at step S103 is No, the flow returns to step S101. The state that the controller waits for the recording operation or the reproducing operation at step S102 or step S103 is a standby state in the camera mode.

When the determined result at step S102 is Yes (namely, the user has operated the release key 301 for recording a moving picture) or the photo key 304 for recording a still picture, the flow advances to step S114. At step S114, the controller executes a control process for recording the still picture as moving picture data or still picture data to the disc. At step S115, the controller determines whether or not the recording operation has been completed. When the determined result at step S115 is No (namely, unless the recording operation has been completed), the flow returns to step S114. Thus, the recording operation is continued.

The controller determines whether the record space of the disc run out, a still picture has been recorded, or the record stop operation has been performed (at step S115). When the determined result at step S115 is Yes, the flow advances to step S116. At step S116, the controller performs a control process for completing the recording operation (including an updating operation for the management information corresponding to the recorded result). Thereafter, the flow returns to step S101. In other words, the controller enters the standby state.

When the determined result at step S103 is Yes (namely, the user has performed the reproducing operation using the reproduction/pause key 308), the flow advances to step S104. At step S104, the controller starts reproducing the last track as a camera mode track. The controller repeats the reproducing operation for the last track until the controller detects a pausing operation. At that point, the controller also executes a control for displaying a moving picture as reproduced data on the display panel 67.

When the determined result at step S105 is Yes (namely, the user has operated the reproduction/pause key 308 again), the flow advances to step S106.

At step S106, the controller executes a control process for pausing the reproducing operation. At that point, the reproducing operation of data is stopped at the pause position Pst1. In addition, the controller performs a display control so that data at an address corresponding to the pause position Pst is displayed as a still picture on the display panel 67.

At step S107, the controller determines whether or not the user has rotated the jog dial 303 for the frame-by-frame reproducing operation. When the determined result at step S107 is No, the flow advances to step S109. At step S109, the controller determines whether or not the user has operated the erase key 302. When the determined result at step S109 is No, the flow returns to step S106. At step S106, the controller keeps the pause state at the pause position Pst1.

When the determined result at step S107 is Yes, the flow advances to step S108. At step S108, the controller executes a control process for a frame-by-frame picture reproducing operation corresponding to the rotating operation of the jog dial. In other words, as was described with reference to FIG. 11B, the controller changes and designates the pause position Pst1 and displays data at an address corresponding to the changed pause position as a picture. When the determined result at step S109 is No (namely, the flow returns to step S106 after step S108), picture data at an address corresponding to the pause position Pst1 changed by the control process for the frame-by-frame picture reproducing operation is displayed.

When the determined result at step S109 is Yes (namely, the erase key 302 has been operated), the flow advances to step S110.

At step S110, as was described with reference to FIG. 11C, the controller executes a control process for repeatedly reproducing a track portion starting from an address after the pause position Pst1 that has been finally designated. At that point, a picture as reproduced data is displayed on the display panel 67. As was described above, the controller executes a control process for displaying a dialog that contains a cancel button and an erase decision button. Alternatively, the controller may execute a control process for repeatedly reproducing trimmed data before the pause position Pst1.

At step S111, the controller determines whether or not the user has operated the cancel button on the dialog (namely, the cancel deciding operation).

When the determined result at step S111 is Yes, the flow returns to step S101. At step S111, the controller restores the standby state in the camera mode. On the other hand, when the determined result at step S111 is No, the flow advances to step S112.

At step S112, the controller determines whether or not the user has performed the erase deciding operation (with the decision button on the dialog). When the determined result at step S112 is No, the flow returns to step S110. At step S110, the controller repeats the reproducing operation for track data after the pause position Pst1. On the other hand, when the determined result at step S112 is Yes, the flow advances to step S113. At step S113, the controller executes a process for erasing a track data portion after the pause position Pst1. In other words, the controller updates a predetermined content of the management information so that an area of the data portion of the last track after the pause position Pst1 is managed as a blank area. At that point, the controller may execute a process for displaying a message that represents that data has been erased on the display panel 67.

After the controller has completed the process at step S113, the flow returns to step S101. At step S101, the controller enters the standby state in the camera mode.

Figures 13, 13A:
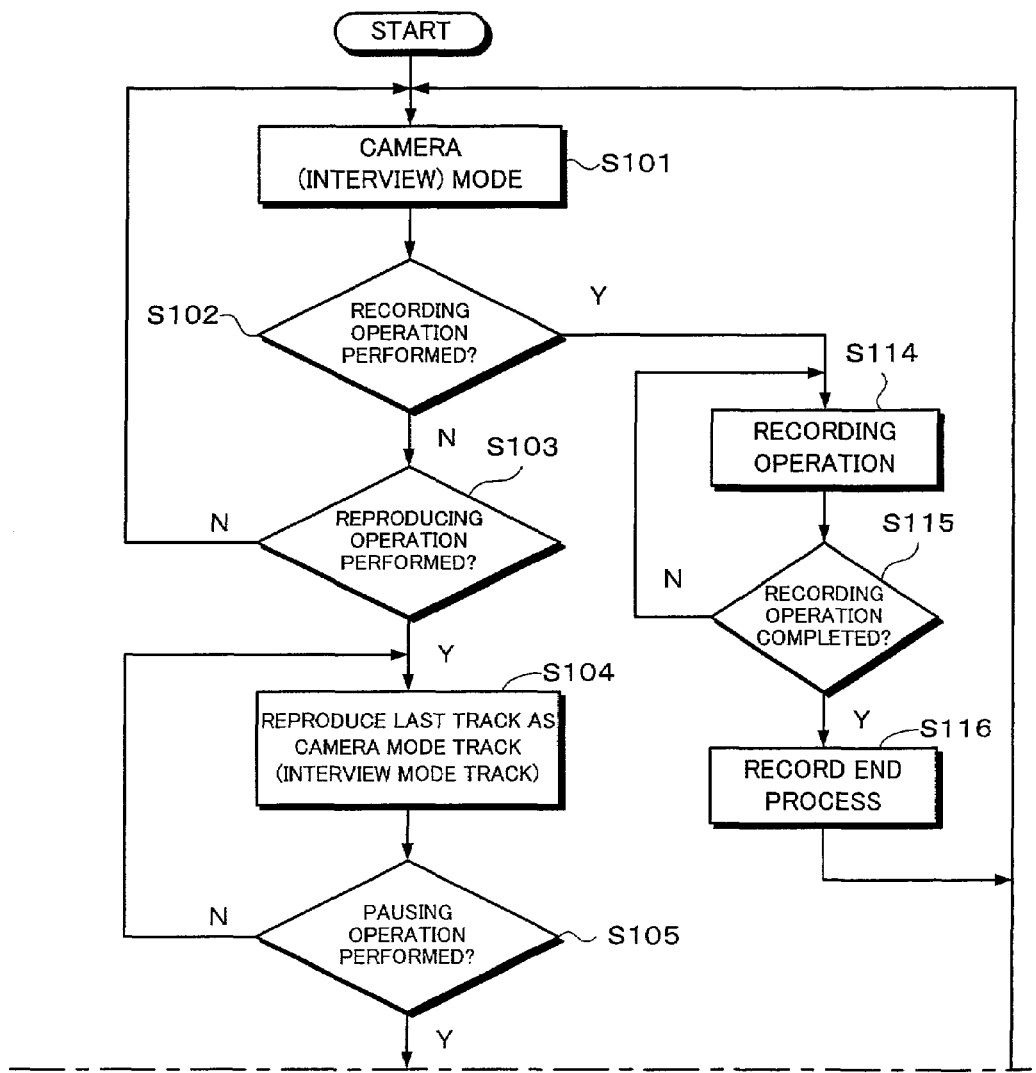
FIGS. 13A and 13B are (a first portion and a second portion of) a flow chart showing a process for accomplishing the data end position change editing operation.
Figure 13B:
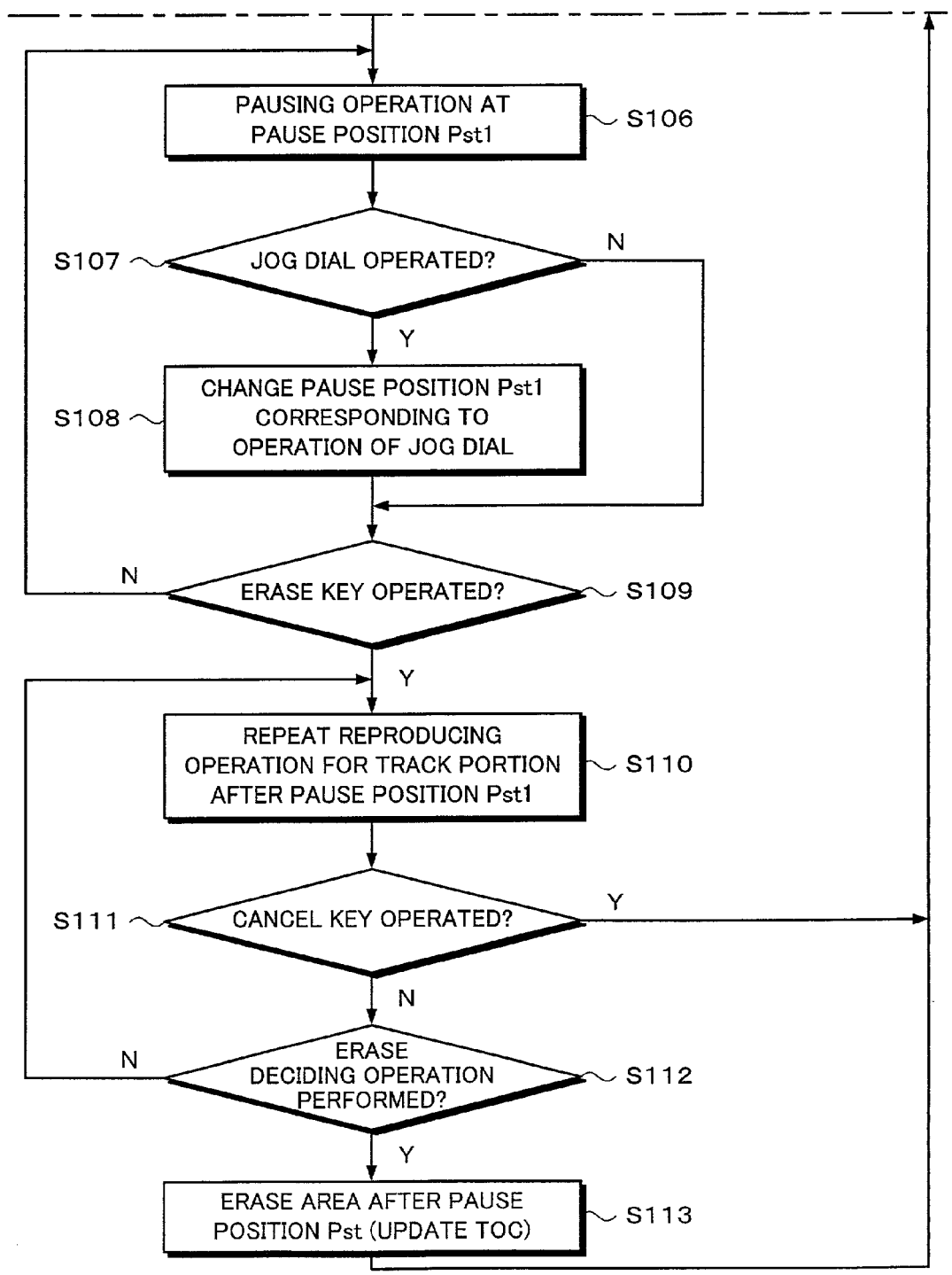

The process for the data end position changing operation in the interview mode shown in FIG. 12 can be applied to the process in the camera mode shown in FIG. 13. However, in this case, at step S101, the interview mode is designated. At step S104, the controller reproduces the last track as an interview mode track. At that point, as a reproducing operation, the controller executes the reproduction control process so that sound/still picture of an interview mode track is output.

At step S102, the controller determines whether or not the user has operated for example the record key 313. When the determined result at step S102 is Yes, the flow advances to step S114. At step S114, the controller executes a recording operation in the interview mode.

When another mode other than the camera mode (or the interview mode) is designated, the flow exits from the routine shown in FIG. 13.

To more simplify the data end position change editing operation, the frame-by-frame picture reproducing operation can be omitted.

The data end position change editing operation may be selected from an edit menu that is called by a predetermined operation so as to change the data end position of a desired track.

When the data end position change editing operation can be performed in the camera mode or the interview mode as a recordable mode, the user can edit data by only performing a reproducing operation without need to change the current mode to the edit mode. Thus, the operability of the video camera for the user is improved.

In addition, although a track as an object for the data end position change editing operation can be freely selected, when the last track is an object that is edited, considering a scene that will be photographed next, the last track connected to the scene can be quickly edited. Thus, the operability of the video camera for the user is improved.

In the above-described example, the structure for changing the end address corresponding to the pause position Pst1 was described. Alternatively, the start address of a track that contains an address designated with a pause position Pst1 corresponding to the pause position Pst can be changed. In other words, a structure of which track data before a pause position Pst is erased can be accomplished.

7. Trimming Operation

According to the embodiment, not only the end address of a track, but the start address thereof can be changed.

Thus, when the start address of a track is changed, the end address thereof may be also changed in the same process.

To do that, two positions of reproduced data are designated. The start address is changed corresponding to the early designated position. The end address is changed corresponding to the later designated position. In other words, data other than the area between the two designated positions is erased. The data in the area between the two positions is trimmed as new track data.

Next, with reference to FIG. 14, an example of such a trimming editing operation will be described.

Figures 14A, 14B:
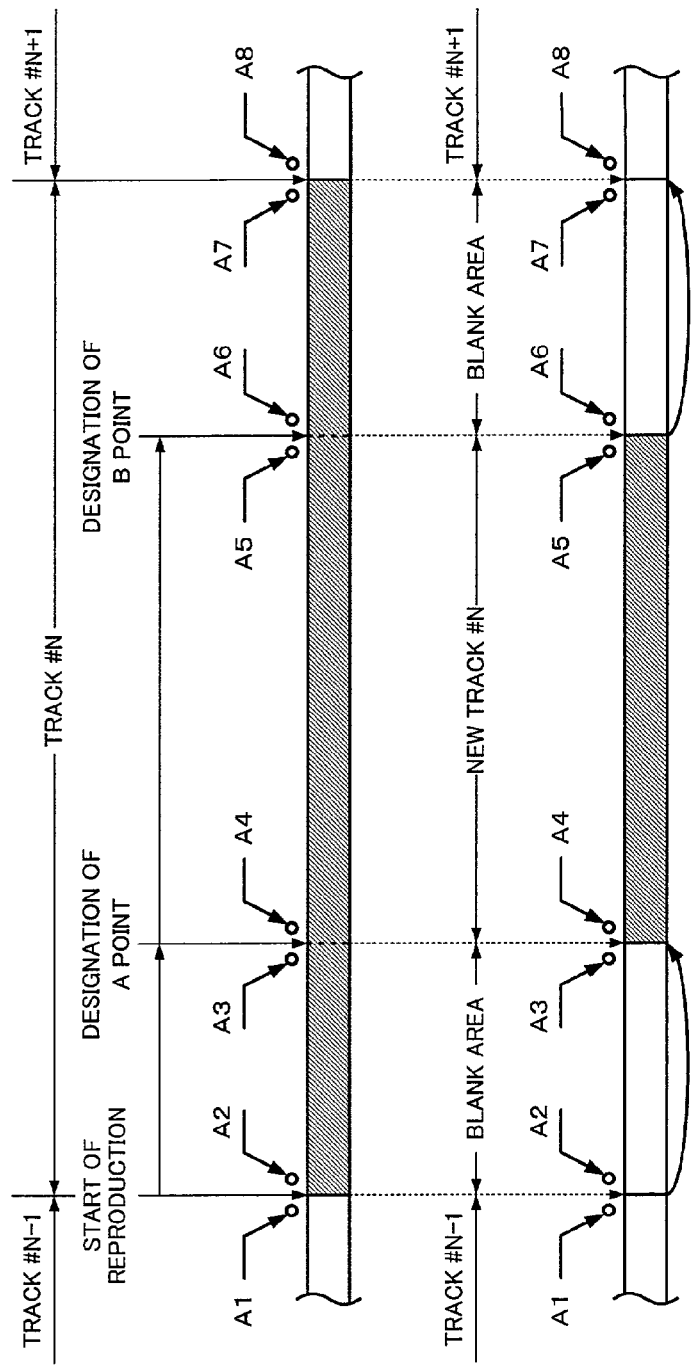
FIG. 14A is a schematic diagram for explaining a first step of a trimming editing operation according to the embodiment.
FIG. 14B is a schematic diagram for explaining a second step of the trimming editing operation according to the embodiment.

As shown in FIG. 14A, it is assumed that the reproduction of a particular track #N is started. As shown in FIG. 14A, the start address and the end address of the track #N are A2 and A7, respectively. The reproduction is started from the start address A2.

While the track #N is being reproduced, the user can designate two points using a particular key or the like. In FIG. 14A, a first position designating operation is performed at a data position corresponding to an address A3 after the start address A2. As a result, the A point is designated.

After the A point has been designated, the track reproducing operation is continued. In this state, when the user performs a second position designating operation, a B point is designated. In FIG. 14A, the B point is designated corresponding to the address A5.

After the two points A–B have been designated, when the user decides an erasing operation using for example the erase key 302, as shown in FIG. 14B, the start address of the track #N is changed from the address A2 to the address A4 corresponding to the A point. In addition, management information is rewritten so that the end address is changed from the address A7 to the address A5 corresponding to the B point. As a result, the data area between the addresses A2 and A3 as track data before the address A4 and the data area between the addresses A6 and A7 as track data after the address A5 become blank areas. In other words, those data areas are treated as areas erased from the original track data.

In other words, while data is being reproduced, two points are designated. Thereafter, a deciding operation for deleting a designated area. Thus, by such easy operations, a trimming editing operation for trimming data in the middle of an original track and creating a new track can be performed.

In the reproduction mode, when the reproduction of the track #N–1 before the track #N is completed at the address A1, the reproduction of the address #N is started at the address A4 and completed at the address A5. Thereafter, the reproduction of the track #N+1 is started at the address A8.

In the trimming editing operation shown in FIG. 14, the area between the A point and the B point may be finely adjusted by the frame-by-frame (or element-by-element) reproducing operation as was described with reference to FIGS. 11A to 11D and 12A to 12D. In the trimming editing operation, any desired track can be selected and edited. Alternatively, as in the above-described data end position change editing operation, after the reproducing operation is performed in the camera mode or the interview mode, the editing operation may be performed for the last track.

In the trimming editing operation, an area between an A point and a B point may be designated on a plurality of tracks from which data is successively reproduced. In this case, a trimming operation of which data other than the area between the A point and the B point is erased from data of all tracks recorded on the disc (in this embodiment, all tracks in the same mode (all camera mode tracks or all interview mode tracks) can be performed.

In the above-described data end position change editing operation and trimming editing operation, a camera mode track from and to which a moving picture/sound are recorded and reproduced and an interview mode track from and to which a sound (as main data) and still pictures (as supplemental data) are recorded and reproduced are considered. In the data end position change editing operation and the trimming editing operation, only an audio track that contains a sound may be edited.

In addition, the present invention can be also applied to a file of character information such as text data. For example, since a sound recognizing function has been improved so far, a recognized sound can be converted into a character information file.

When the data end position change editing operation and the trimming editing operation according to the present invention are applied to such a character information file, a proofreading operation for the file can be easily performed.

According to the embodiment, as a medium from and to which data is recorded and reproduced, a disc shaped record medium is used. Alternatively, the embodiment can be applied to a non-volatile memory medium such as a flash memory that has become common. The non-volatile memory medium is composed of a memory device. In the memory medium, the record data is managed with the so-called FAT (File Allocation Table). When the data end position change editing operation and the trimming editing operation according to the present invention are performed, the content of the FAT is updated.

According to the embodiment, as the audio codec corresponding to the MD-DATA 2 format, the ATRAC2 is used. However, in consideration of a sound recording operation for a semiconductor memory, the format is not limited. In other words, ATRAC3, MPEG1, Audio Layor3 (MP3), AAC (MPEG2 Advanced Audio Codec), Twin VQ (Tranceform Domain Weighted Interleave Vector Quantization), or WMA (Windows Media Audio) may be used.

As was described above, according to the present invention, while data is being reproduced, corresponding to the address of the stop position of the stop operation (pausing operation), the end address or start address of new data is designated. Corresponding to the designated end address or start address, the management information is updated.

In a device using a tape medium on which data is recorded without management information, information should be actually overwritten or erased to/from the tape. However, according to the present invention, information of the end address or start address that is changed corresponding to the stop data position of the reproduction can be updated with management information. In other words, since management information is updated without need to change data, an editing operation for changing the end address or the start address can be easily performed.

In a system that manages data of a record medium with management information, to obtain the same edited result as the above-described end address change editing operation, it is necessary to divide data as an object that is edited and erase one of the divided data portions. In contrast, according to the present invention, such an editing operation can be very easily performed in such a manner that after the reproducing operation is stopped, a data erasing operation is performed.

In the structure that when an erase designating operation is performed, management information is updated (namely, data is erased), since the erase designating operation of the user causes data to be erased, data can be prevented from being mistakenly erased.

In the structure that the end address or start address can be changed and edited in a record mode of which data can be recorded (camera mode/interview mode), even if the user has designated a record mode for photographing a picture, he or she can perform an editing operation without need to perform a switching operation to the edit mode. Thus, the operability of the video camera for the user is improved.

According to the present invention, when a plurality of record modes—for example, a camera mode and an interview mode can be designated, data recorded corresponding to the currently designated mode is selected from data recorded on the disc. In this case, since the designated record mode corresponds to the selected data type, the operability of the editing operation is improved.

As data that is edited, data managed as a last program (track) is reproduced. When the user actually uses the video camera, data is recorded after the last program. Thus, when the user edits a program, it is most likely the last program. Thus, when data of the last track is reproduced, since it can be easily edited, the editing function of the present invention becomes more useful.

In addition, after the reproduction of data is stopped, when the address (pause position) corresponding to the stop position can be changed, the data erase position can be finely adjusted. As a result, the user can obtain more satisfied results of the editing operation.

In addition, when a data portion after or before the address (pause position) corresponding to the designated stop position is reproduced, the user can check whether his or her designated pause position (namely, erase position) is proper.

When the data portion is repeatedly reproduced, the user can carefully check the erase position.

In addition, according to the present invention, since two data positions of data that is reproduced are designated, the start address and end address of data can be changed and designated corresponding to the two data positions. In other words, when an area between two positions is designated for data that is reproduced, an editing operation for trimming the area between the start address and end address corresponding to the two designated positions and erasing the other data portions before and after the trimmed area can be performed.

In this case, such an editing operation can be more easily performed than the case that a tape medium is used. In addition, a complicated data editing operation of which after a data dividing operation is performed, a data erasing operation is performed is not required.

The invention claimed is:

1. A recording and/or reproducing apparatus for recording and/or reproducing data to and/or from a storage medium having a data area and a management area, the data area storing data, the management area storing management information for managing the data, the apparatus comprising:
   reproducing means for reproducing the data corresponding to management information that is read from the storage medium;
   stopping means for stopping reproducing the data; and
   updating means for updating the management information so that an address of the storage medium corresponding to the stop position of the reproduced data becomes the end address of the reproduced data;
   wherein before said updating means updates the management information, said reproducing means check-reproduces a portion that is erased and that is after the address of the storage medium corresponding to the stop position of the reproduced data.

2. A recording and/or reproducing apparatus for recording and/or reproducing data to and/or from a storage medium having a data area and a management area, the data area storing data, the management area storing management information for managing the data, the apparatus comprising:
   reproducing means for reproducing the data corresponding to management information that is read from the storage medium;
   stopping means for stopping reproducing the data; and
   updating means for updating the management information so that an address of the storage medium corresponding to the stop position of the reproduced data becomes the end address of the reproduced data;
   wherein before said updating means updates the management information, said reproducing means check-reproduces the data whose later portion has been erased and that is before the address of the storage medium corresponding to the stop position of the reproduced data.

3. A recording and/or reproducing apparatus for recording and/or reproducing data to and/or from a storage medium having a data area and a management area, the data area storing data, the management area storing management information for managing the data, the apparatus comprising:

reproducing means for reproducing the data corresponding to management information that is read from the storage medium;

stopping means for stopping reproducing the data; and updating means for updating the management information so that an address of the storage medium corresponding to the stop position of the reproduced data becomes the end address of the reproduced data;

wherein said storage medium is an optical disc which has a first track and a second track, a first track being composed of a land and one of a wobbled track and a non-wobbled track, a second track being composed of the land and the wobbled track or the non-wobbled track that is not used for the first track, the wobbled track having two wobbled surfaces, the non-wobbled track having two non-wobbled surfaces, information being recorded on the first track and the second track.

4. A recording and/or reproducing apparatus for recording and/or reproducing data to and/or from a storage medium having a data area and a management area, the data area storing data, the management area storing management information for managing the data, the apparatus comprising:

reproducing means for reproducing the data corresponding to management information that is read from the storage medium;

designating means for designating a particular time point of the reproduced data; and updating means for updating the management information so that an address of the storage medium corresponding to the designated time point of the reproduce data becomes the start address of the reproduced data;

wherein before said updating means updates the management information, said reproducing means check-reproduces a portion that is erased and that is after the address of the storage medium corresponding to the designated time point of the reproduced data.

5. A recording and/or reproducing apparatus for recording and/or reproducing data to and/or from a storage medium having a data area and a management area, the data area storing data, the management area storing management information for managing the data, the apparatus comprising:

reproducing means for reproducing the data corresponding to management information that is read from the storage medium;

designating means for designating a particular time point of the reproduced data; and updating means for updating the management information so that an address of the storage medium corresponding to the designated time point of the reproduce data becomes the start address of the reproduced data;

wherein before said updating means updates the management information, said reproducing means check-reproduces the data whose early portion has been erased and that is after the address of the storage medium corresponding to the designated time point of the reproduced data.

6. A recording and/or reproducing apparatus for recording and/or reproducing data to and/or from a storage medium having a data area and a management area, the data area storing data, the management area storing management information for managing the data, the apparatus comprising:

reproducing means for reproducing the data corresponding to management information that is read from the storage medium;

designating means for designating a particular time point of the reproduced data; and updating means for updating the management information so that an address of the storage medium corresponding to the designated time point of the reproduce data becomes the start address of the reproduced data;

wherein said storage medium is an optical disc which has a first track and a second track, a first track being composed of a land and one of a wobbled track and a non-wobbled track, a second track being composed of the land and the wobbled track or the non-wobbled track that is not used for the first track, the wobbled track having two wobbled surfaces, the non-wobbled track having two non-wobbled surfaces, information being recorded on the first track and the second track.

* * * * *

UNITED STATES PATENT AND TRADEMARK OFFICE
CERTIFICATE OF CORRECTION

| | |
|---|---|
| PATENT NO. | : 7,099,557 B1 |
| APPLICATION NO. | : 09/830309 |
| DATED | : August 29, 2006 |
| INVENTOR(S) | : Shiro Morotomi et al. |

It is certified that error appears in the above-identified patent and that said Letters Patent is hereby corrected as shown below:

*On the title page, item (57), line 8, "updates" should read --updating--.

*In claim 4, column 31, line 34, "reproduce" should read --reproduced--.

*In claim 5, column 32, line 9, "reproduce" should read --reproduced--.

*In claim 6, column 32, line 33, "reproduce" should read --reproduced--.

Signed and Sealed this

Twenty-sixth Day of December, 2006

JON W. DUDAS
*Director of the United States Patent and Trademark Office*